(12) United States Patent
Hayashi et al.

(10) Patent No.: US 10,801,885 B1
(45) Date of Patent: Oct. 13, 2020

(54) RECONFIGURABLE LIQUID METAL PLASMONIC ARRAYS FOR CARBON TRANSDUCERS

(71) Applicant: Naval Information Warfare Center, Pacific, San Diego, CA (US)

(72) Inventors: Cody K. Hayashi, Waipahu, HI (US); Richard C. Ordonez, Mililani, HI (US); Nackieb M. Kamin, Annandale, VA (US); David Garmire, Honolulu, HI (US)

(73) Assignee: United States of America as Represented by the Secretary of the Navy, Washington, DC (US)

( * ) Notice: Subject to any disclaimer, the term of this patent is extended or adjusted under 35 U.S.C. 154(b) by 27 days.

(21) Appl. No.: 16/392,945

(22) Filed: Apr. 24, 2019

(51) Int. Cl.
*G01N 3/60* (2006.01)
*G01J 1/42* (2006.01)
(52) U.S. Cl.
CPC ..................... *G01J 1/42* (2013.01)
(58) Field of Classification Search
CPC ............ H01L 31/022466; H01L 33/42; H01L 51/5203; G01N 21/554; G01N 21/658; G01N 2021/7709; G01N 2021/7776; G01N 21/648; G01N 21/7703; G01N 2201/06113; G01N 2201/0612; G01N 2201/0633; G01N 2201/068; G01N 29/022; G01N 29/2418; G01N 21/359; G01N 30/02; G01N 15/0205; G01N 17/00; G01N 2015/0294; G01N 21/3554; G01N 21/3559; G01N 21/3563; G01N 21/3577; G01N 21/552; G01N 30/88; G01N 15/0211; G01N 15/0227; G02B 26/005; G02B 3/14; G02B 5/06; G02B 6/1226; G02B 6/1228; G02B 1/06; G02B 2006/12147; G02B 3/12; G02B 19/0014;
(Continued)

(56) References Cited

U.S. PATENT DOCUMENTS 10,048,200 B2   8/2018  Abdulhalim
10,268,036 B1 *  4/2019  Schultz ................ G02B 3/14
(Continued)

OTHER PUBLICATIONS

M. Jadidi et al., "Tunable Terahertz Hybrid Metal-Graphene Plasmons," Nanoletters, vol. 15, No. 10, pp. 7089-7104, Sep. 2015.
(Continued)

*Primary Examiner* — Irakli Kiknadze
(74) *Attorney, Agent, or Firm* — Naval Information Warfare Center, Pacific; Kyle Eppele; James McGee

(57) ABSTRACT

A plasmonic transducer includes a fluidic network layer, a carbon-based substrate, a liquid metal and an electromagnetic system. The fluidic network layer has a fluidic network layer front, a fluidic network layer back, a first through-hole passing from the fluidic network layer front to the fluidic network layer back. The carbon-based substrate is disposed on the fluidic network layer back. The liquid metal is disposed in the first through-hole. The electromagnetic system is operable to change the liquid metal from a first liquid metal state to a second liquid metal state. The transducer is operable to provide a first output signal when the liquid metal is in the first liquid metal state. The transducer is operable to provide a second output signal when the liquid metal is in the second liquid metal state.

19 Claims, 22 Drawing Sheets

(58) Field of Classification Search
CPC .......... G02B 19/0061; G02B 27/0922; G02B 27/0955; G02B 6/12002; G02B 6/125; G02B 6/14; G01J 1/42; G01J 1/4204; G01J 1/4257; G01J 1/429; G01J 1/0488; G01J 1/4228; G01J 4/04; G01J 5/0846; G01J 1/0219; G01J 1/04; G01J 1/0437; G01J 1/44; G01J 1/58; G01J 1/0271; G01J 1/02; G01J 1/0403; G01J 1/0247; G01J 3/2823; G01J 3/32; G01J 2005/0077; G01J 3/0224; G01J 3/10; G01T 1/02; G01T 7/00; G01T 1/026; G01T 1/16; G01T 1/167; G01T 1/17; G01T 1/244; G01T 3/08; A61B 5/0022; A61B 5/1112; A61B 5/1123; A61B 5/6898; A61B 5/0059; A61B 5/0088; A61B 5/02; A61B 5/0261; A61B 5/029; A61B 5/14552; A61B 5/412; A61B 5/416; A61B 5/445; A61B 5/7264
USPC ...................................................... 250/341.1
See application file for complete search history.

(56) References Cited

U.S. PATENT DOCUMENTS

2015/0334487 A1* 11/2015 Bowers ............... G10K 11/345
                                                     367/138
2016/0011109 A1   1/2016 Kim
2018/0059690 A1   3/2018 Coleman
2018/0100802 A1   4/2018 Zaretski et al.
2018/0157027 A1   6/2018 Kitahara

OTHER PUBLICATIONS

L. Ju et al., "Graphene plasmonics for tunable terahertz metamaterials," Nature vol. 6, pp. 630-634, Sep. 2011.

L. Wang et al., "Highly Sensitive and Wide-Band Tunable Terhertz Response of Plasma Waves Based on Graphene Field Effect Transistors," Scientific Reports, vol. 4, Jun. 2014.

J. Wang et al., "Liquid metal-based plasmonics," Optical Express, vol. 20, No. 3, pp. 2346-2353, 2012.

J. Cox and F. Javier Garcia de Abajo, "Electrically tunable nonlinear plasmonics in graphene nanoislands," vol. 5, Dec. 2014.

F. Javier Garcia de Abajo, "Graphene Plasmonics: Challenges and Opportunities," ACS Photonics, vol. 1, No. 3. pp. 135-152, Feb. 2014.

Z. Fang et al., "Plasmon-Induced Doping of Graphene," ACS Nano, vol. 6, No. 11, pp. 10222-10228, Sep. 2012.

R. Gough et al., "Continuous Electrowetting of Non-toxic Liquid Metal for RF Applications," IEEE Access, vol. 2, pp. 874-882, 2014.

* cited by examiner

RECONFIGURABLE LIQUID METAL PLASMONIC ARRAYS FOR CARBON TRANSDUCERS

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 104059.

BACKGROUND OF THE INVENTION

Embodiments of the invention relate to plasmonic transducers.

Terahertz (THz) sensors mark the boundary between electronics and photonics, and have been of popular scientific interest due to their revolutionary potential in fast-sensing fields such as spectroscopy, imaging, and communication. Yet, there is a lack of well-developed solid-state sources and detectors operating in the THz range. Plasmonic metamaterials are materials that exploit surface plasmons, or electron oscillations, rather than electron-hole pairs to achieve enhanced optical properties. Because of the reliance on surface plasmons rather than traditional electrical effects, plasmonics are a fundamental phenomenon in the THz range. Plasmonics enable sensing with minimized heat production and energy loss, and rapid spectroscopy without the need for mirrors or gratings.

Since plasmonic metamaterials can be used to absorb and measure electromagnetic signals, they can also be used to control the reflected electromagnetic signal, or photoluminescence. As an excitation light source is incident on the plasmonic transducer, surface plasmons form and resonate with the incident light. The interaction between the surface plasmons and incident light effectively changes the absorption and reflection characteristics of the system. This can support a plethora of applications, including holograms, lenses, and optical displays.

Metals have been a predominant research area for exploiting plasmonics. However, in the THz range, certain metals such as aluminum exhibit unreasonably high propagation losses. Additionally, although the metals' frequency responses can be tuned through geometry, they remain fixed once fabricated. Graphene has yielded huge optical enhancements from plasmonics, with researchers observing near-field intensities greater than $10^5$ times larger than the incident light. Furthermore, when graphene is coupled with quantum dots to produce a hybrid phototransistor, the result is ultrahigh gain of $10^7$ A/W. Yet, as the case with metals, they are not tunable after fabrication.

There exists a need for a tunable plasmonic transducer.

SUMMARY OF THE INVENTION

Aspects of the present disclosure provides a method of making and using a tunable plasmonic transducer.

An aspect of the present disclosure is drawn to a plasmonic transducer includes a fluidic network layer, a carbon-based substrate, a liquid metal and an electromagnetic system. The fluidic network layer has a fluidic network layer front, a fluidic network layer back, a first through-hole passing from the fluidic network layer front to the fluidic network layer back. The carbon-based substrate is disposed on the fluidic network layer back. The liquid metal is disposed in the first through-hole. The electromagnetic system is operable to change the liquid metal from a first liquid metal state to a second liquid metal state. The transducer is operable to provide a first output signal when the liquid metal is in the first liquid metal state. The transducer is operable to provide a second output signal when the liquid metal is in the second liquid metal state. This output signal can include an electrical signal and/or a reflected optical signal.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE EMBODIMENTS

The manipulation of liquid metal and/or gallium alloy structures is disclosed to change the geometry, spacing, and periodicity of a liquid metal plasmonic array on a carbon-based (including graphene, graphite, or any carbon fullerene) substrate. A non-limiting example embodiment includes the use of reconfigurable liquid metals micro/nano plasmonic structures arrays on a carbon substrate. Aspects of the present disclosure utilize the system to electrically actuate liquid metal and/or gallium alloys' periodicity, aperture diameter, shape, and separation distance to alter the corresponding plasmonic enhancement, and thus change the absorption and reflection characteristics, including frequency and amplitude, of the device-under-test. Reconfigurable liquid metal transitions are achieved via continuous electrowetting. Therefore, the plasmonic characteristics can be altered quickly and in-vitro.

In accordance with aspects of the present disclosure, a proposed technique creates a hybrid transducer with carbon products and reconfigurable liquid metal. It utilizes carbon features, such as graphene's ultrahigh gain and liquid metal's configurability through electrostatic actuation. A liquid metal of a eutectic alloy that includes gallium, indium and tin, holds great potential in plasmonics. Design of eutectic alloy electrodes through periodicity, aperture diameter, shape, and separation distance determine the effective plasmonic response. Furthermore, when a eutectic alloy that includes gallium, indium and tin is placed in an electrolyte such as sodium hydroxide, a square-wave (~30 Hz) or DC voltage across the electrolyte causes a charge gradient across the liquid metal. This gradient actuates the liquid metal through the electrolyte from the negative voltage terminal to the positive voltage terminal. The proposed technique demonstrates that proper fabrication and continuous electrowetting of a liquid metal array on carbon enable a tunable transducer that includes, but is not limited to, controlled absorption and reflection in the visible to infrared range. Moreover, this transducer's frequency response can be electrically controlled after deployment, rather than being limited to power-hungry mechanical control.

Aspects of the present disclosure will now be further described with reference to FIGS. 1-11.

Figure 1:
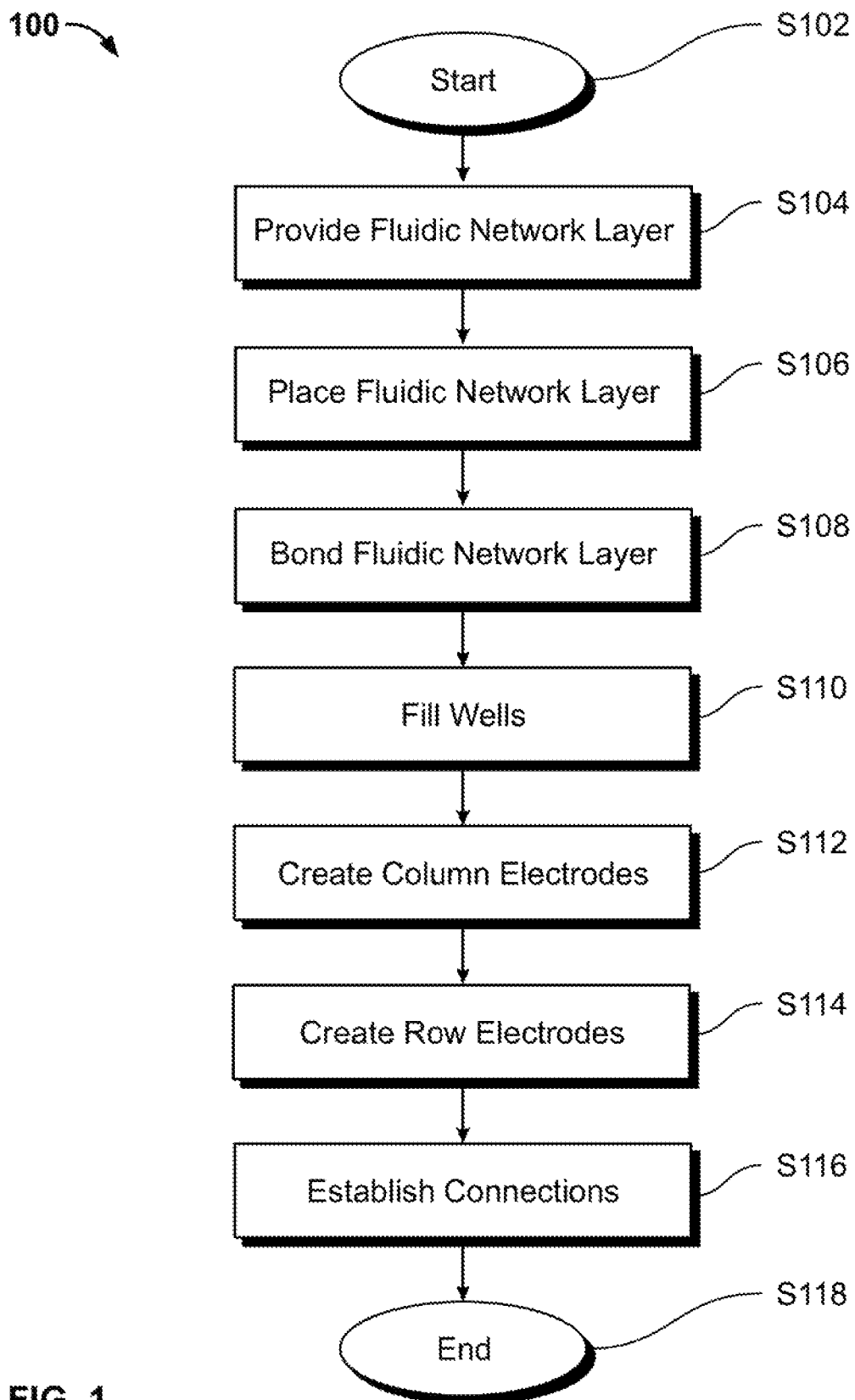
FIG. 1 illustrates an example method for fabricating an example plasmonic transducer in accordance with aspects of the present disclosure.

FIG. 1 illustrates an example method 100 for fabricating an example plasmonic transducer in accordance with aspects of the present disclosure.

As shown in the figure, method 100 starts (S102) and a fluidic network layer is provided (S104). This will be described in greater detail with reference to FIG. 2A.

Figure 2A:
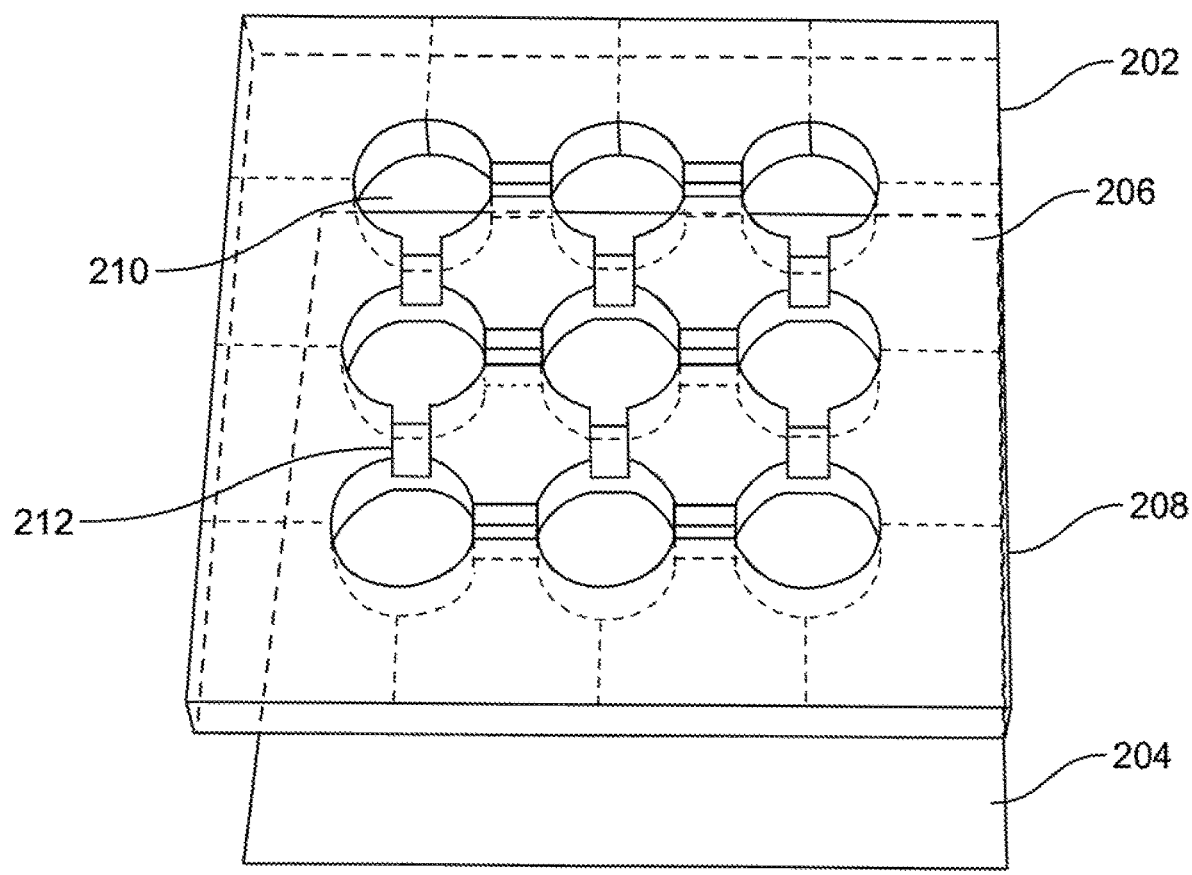
FIGS. 2A-C illustrate first through third stages, respectively, of fabricating an example device frame for use in an example plasmonic transducer in accordance with aspects of the present disclosure.
Figure 2B:
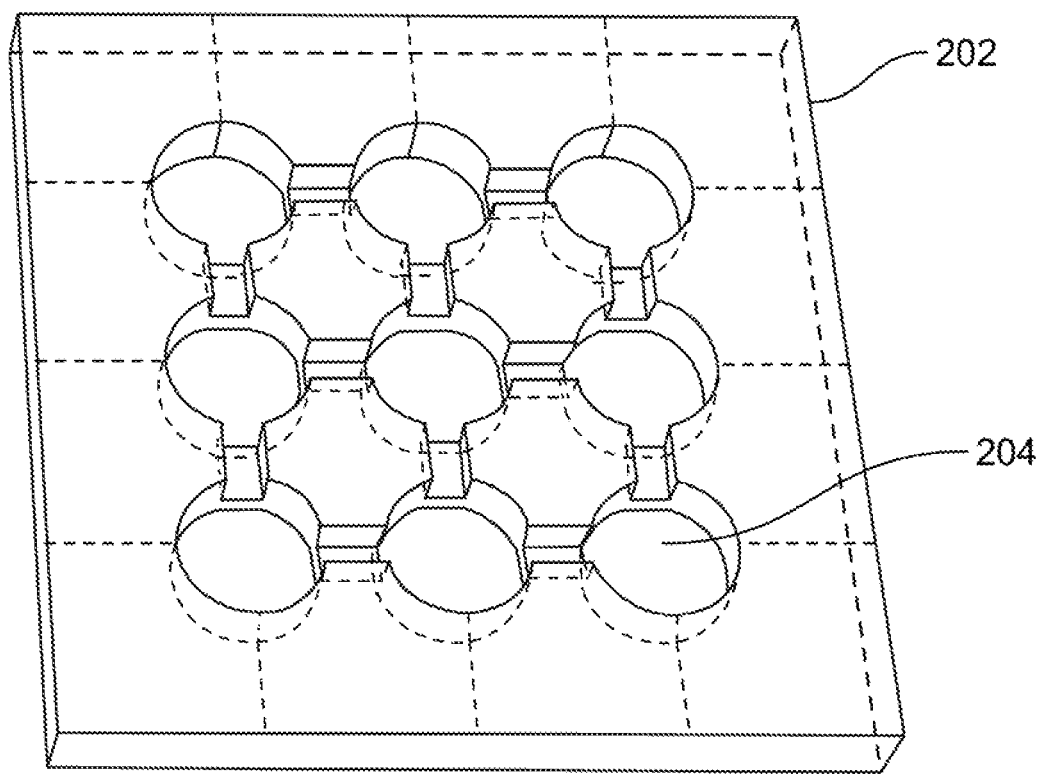
Figure 2C:
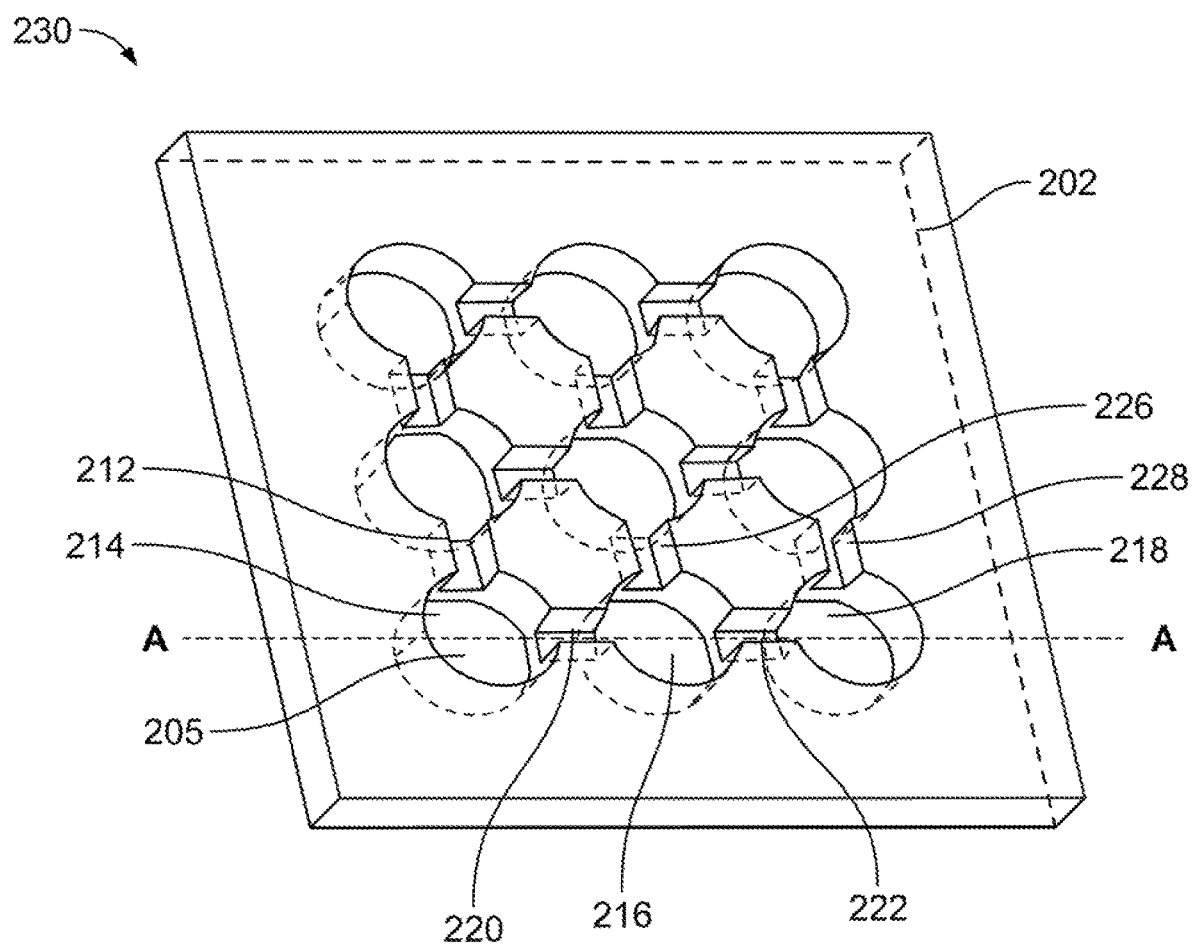

FIGS. 2A-C illustrate first through third stages, respectively, of fabricating an example device frame for use in an example plasmonic transducer in accordance with aspects of the present disclosure.

FIG. 2A illustrates a fluidic network layer 202 and a carbon-based substrate 204.

Fluidic network layer 202 has a fluidic network layer front 206, a fluidic network layer back 208, a plurality of through-holes, one of which is indicated as through-hole 210 and a plurality of channels, one of which is indicated as channel 212.

Each through-hole passes from fluidic network layer front 206 to the fluidic network layer back 208. In this non-limiting example, fluidic network layer 202 includes a 3×3 array of nine through-holes. It should be noted that that a fluidic network layer in accordance with the present disclosure may include any n×m array of through-holes, wherein n and m are positive integers and wherein at least one of n and m is greater than 1. Further, in some embodiments, a fluidic network layer may include a plurality of holes that are not arranged in an array.

Each channel is disposed on fluidic network layer front 206 and has a depth that does not continue to fluidic network layer back 208. Further, each channel is disposed so as to connect two respectively adjacent through-holes.

Carbon-based substrate 204 may be any known device or system that contains a carbon-based material. These devices or systems may be one layer or multiple layers with some layers being non-carbon-based and/or including of carbon composites. Non-limiting examples of carbon-based substrate 204 include a carbon photoconductor, a dielectric stacked on a carbon photoconductor, and a carbon layer stacked with a dielectric layer and reflective metal or semiconductor layer.

Returning to FIG. 1, after the fluidic network layer is provided (S104), the fluidic network layer is placed (S106). For example, as shown in FIG. 2B, fluidic network layer 202 is disposed on carbon-based substrate 204. More specifically, fluidic network layer 202 is disposed such that fluidic network layer back 208 is disposed on carbon-based substrate 204.

Returning to FIG. 1, after the fluidic network layer is placed (S106), the fluidic network layer is bonded (S108). For example, fluidic network layer back 208 may be bonded onto carbon-based substrate 204 by any known method, non-limiting examples of which include via pressure sensitive adhesives, via thermally actuated adhesives and via thermal bonding.

Returning to FIG. 1, after the fluidic network layer is bonded (S108), wells are filled (S110). This will be described in greater detail with reference to FIGS. 2C-3.

As shown in FIG. 2C, a device frame 230 includes carbon-based substrate 204 bonded to fluidic network layer 202. As carbon-based substrate 204 is bonded to fluidic network layer back 208 of fluidic network layer 202, portions of carbon-based substrate 204 are exposed through the plurality of through-holes of fluidic network layer 202. Each through-hole and corresponding exposed portion of carbon-based substrate 204 forms a well, a sample of which are indicated as well 214, well 216 and well 218. Each well will contain a portion of an electrolyte 205 and possibly a liquid metal, as will be described in greater detail below.

Electrolyte 205 is provided in the wells and channels of fluidic network layer 202. Electrolyte 205 may be any liquid electrolyte that is able to have a charge gradient induced therein in the presence of a voltage. A non-limiting example of electrolyte 205 includes sodium hydroxide.

Figure 3:
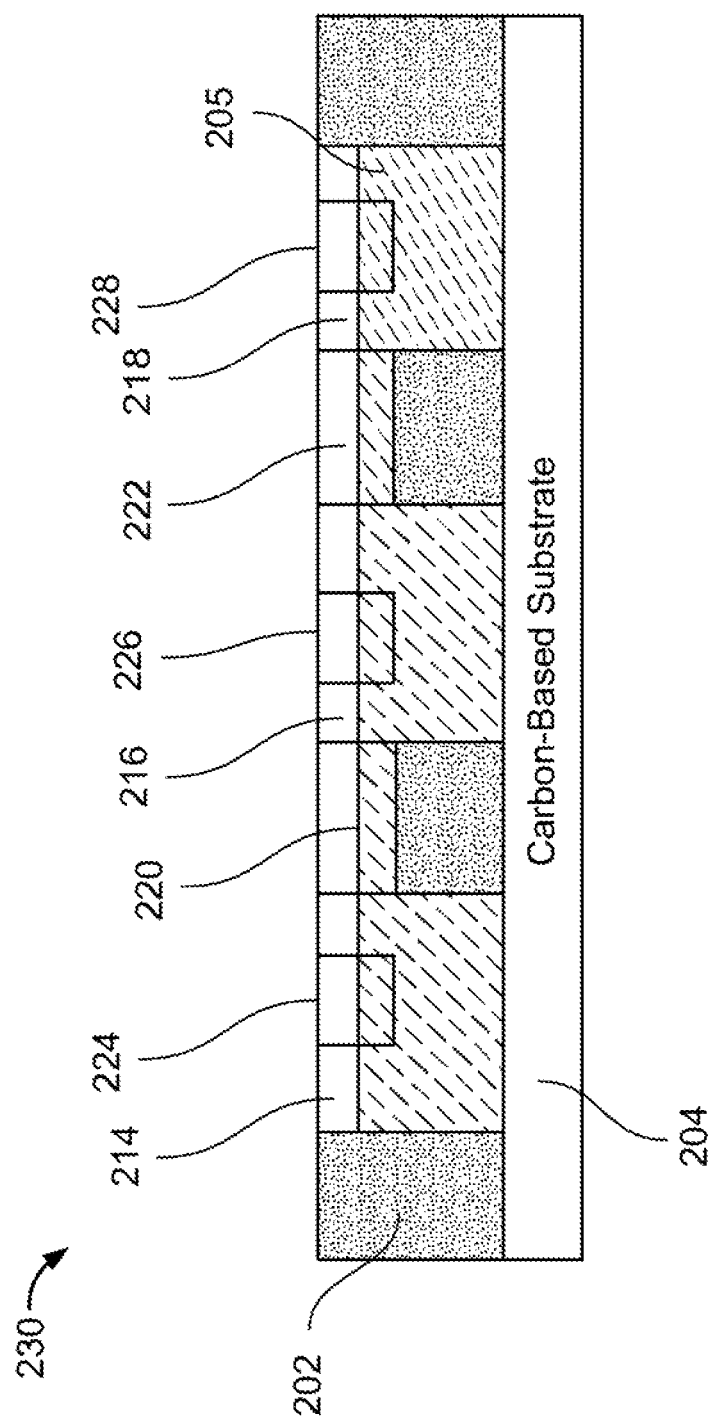
FIG. 3 illustrates a cross sectional view of the example device frame of FIG. 2C along dash-dotted line A-A.

FIG. 3 illustrates a cross sectional view of example device frame 230 along dash-dotted line A-A of FIG. 2C.

As further illustrated in FIG. 3, electrolyte 205 is disposed in all the wells and channels in device frame 230. In particular, as shown in the figure, electrolyte 205 partially fills: well 214, well 216 and well 218; channel 212 and channel 220 that is between well 214 and well 216; channel 226 and channel 222 that is between well 216 and well 218; and channel 228.

After electrolyte 205 is disposed in device frame 230, liquid metal is disposed in a predetermined number of wells. This will be described in greater detail with reference to FIG. 4A.

FIGS. 4A-D illustrate first through fourth remaining stages, respectively, of fabricating an example plasmonic transducer in accordance with aspects of the present disclosure.

Figure 4A:
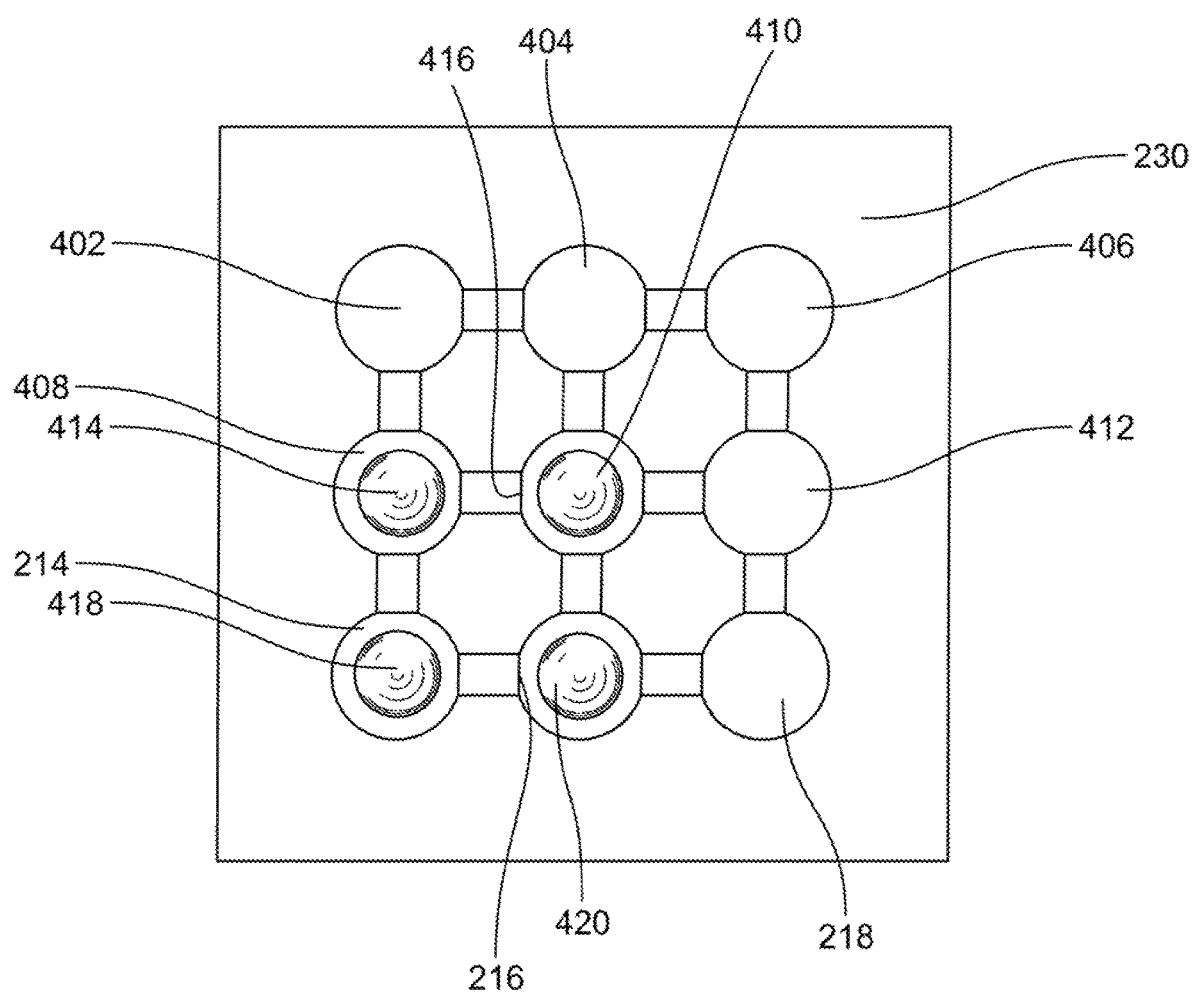
FIGS. 4A-D illustrate first through fourth remaining stages, respectively, of fabricating an example plasmonic transducer in accordance with aspects of the present disclosure.

FIG. 4A illustrates device frame 230 having liquid metal disposed in a predetermined number of wells. As shown in the figure, device frame 230 includes wells 402, 404, 406, 408, 410, 412, 214, 216 and 218. Liquid metal 414 is disposed in well 408, liquid metal 416 is disposed in well 410, liquid metal 418 is disposed in well 214, and liquid metal 420 is disposed in well 216.

In an example embodiment, the liquid metal is a eutectic alloy that comprises at least two of metals selected from a group of metals including gallium, indium and tin. However, any liquid metal may be used that is operable to alter states in the face of an induced electric, magnetic or electromagnetic field.

Returning to FIG. 3, the composition of the carbon-based substrate 204 will dictate the response to an impinging external stimulus, e.g., the relationship of a frequency of impinging light as related to the resulting plasmons.

Returning to FIG. 4A, for similar reasons as discussed above with reference to fluidic network layer 202 and electrolyte 205, the liquid metal will additionally affect the response to an impinging external stimulus as the contacting surfaces will affect the resulting vibrations in the carbon-based substrate 204. In particular, the amount, the shape, the location and the material composition of the liquid metal will have varying effects in the resulting vibrations in the carbon-based substrate 204. In accordance with aspects of the present disclosure, by controllably changing aspects of the liquid metal, the resulting response of the carbon-based substrate 204 may be controllably changed or "tuned." In non-limiting example embodiments, as further described with reference to FIGS. 4B-C below, aspects of the liquid metal are changed by way of applying voltages to rows and columns of electrically addressable electrodes.

Figure 4B:
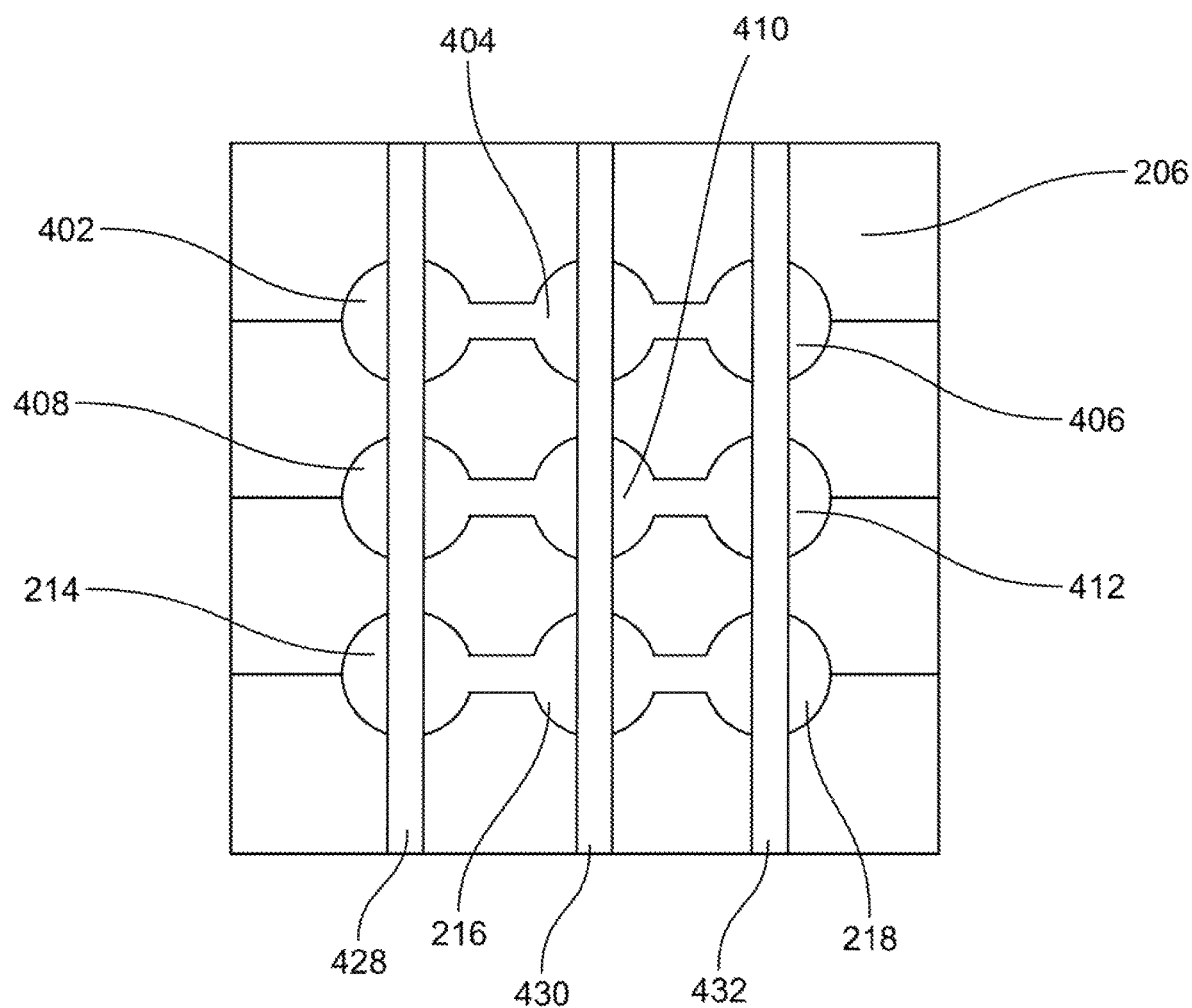

Returning to FIG. 1, after the wells are filled (S110), column electrodes are created (S112). For example, FIG. 4B illustrates column electrodes 428, 430 and 432 being disposed on fluidic network layer front 206 of fluidic network layer 202. In particular, column electrode 428 is disposed so as to extend over wells 402, 408 and 214, column electrode 430 is disposed so as to extend over wells 404, 410 and 216 and column electrode 432 is disposed so as to extend over wells 406, 412 and 218.

Column electrodes 428, 430 and 432 may be any known electrically conductive material, non-limiting examples of which include metals, metal alloys, and semi-metals. Further, column electrodes 428, 430 and 432 may be disposed by any known manner.

Figure 4C:
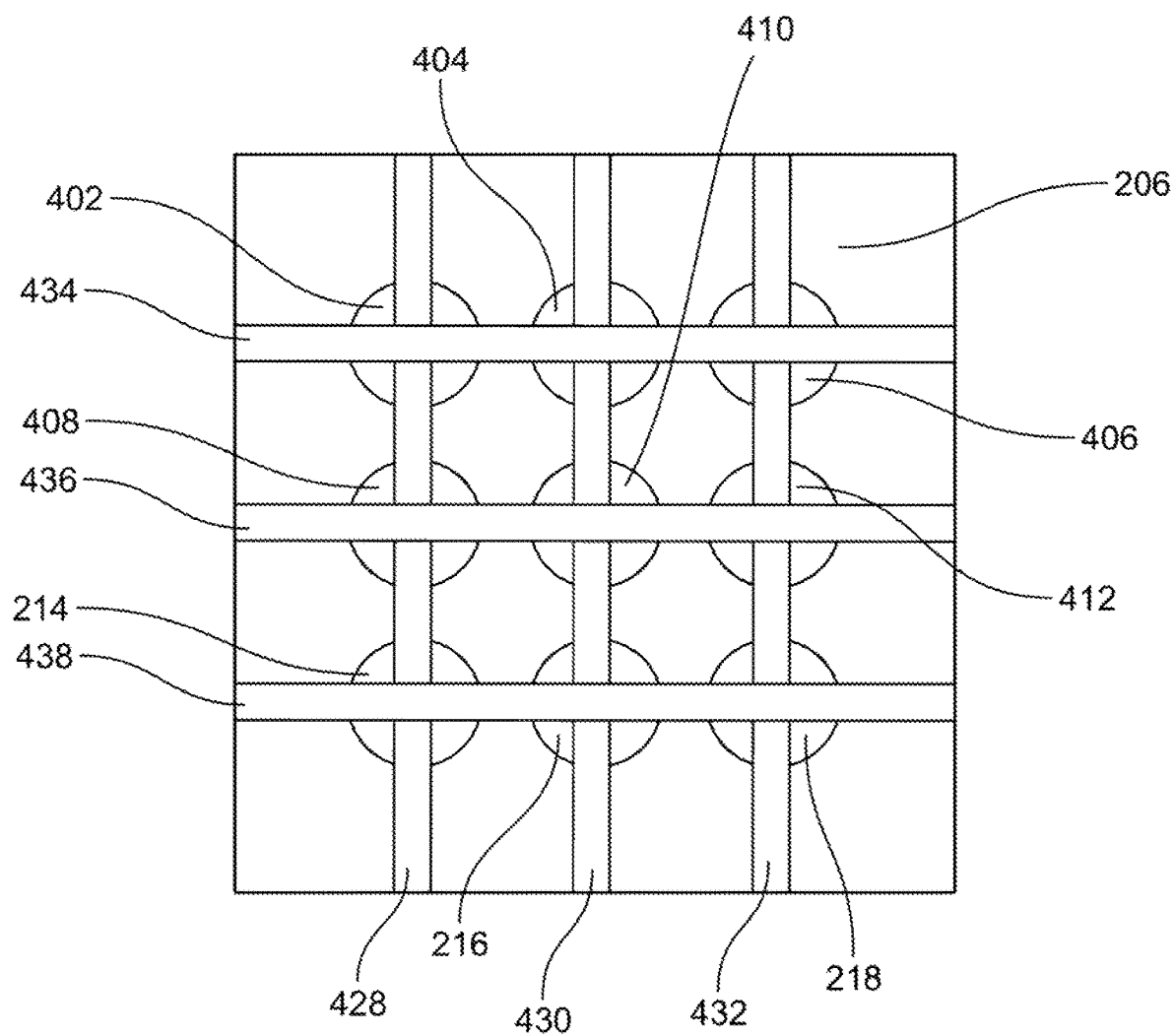
Figure 4D:
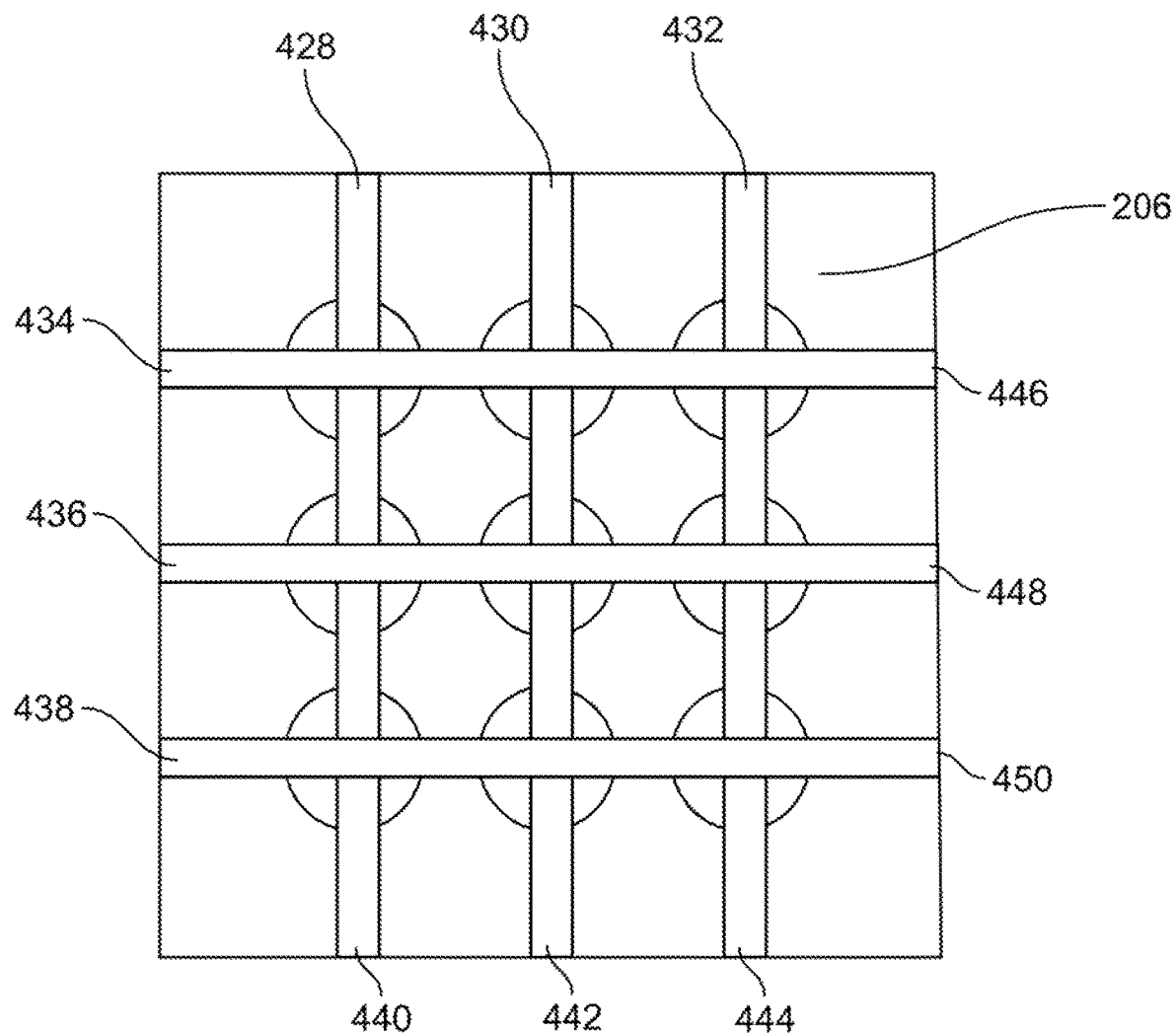

Returning to FIG. 1, after the column electrodes are created (S112), row electrodes are created (S114) with an insulative layer electrically isolating it from the column electrodes. For example, FIG. 4C illustrates row electrodes 434, 436 and 438 being disposed on fluidic network layer front 206 of fluidic network layer 202. In particular, row electrode 434 is disposed so as to extend over wells 402, 404 and 406, row electrode 436 is disposed so as to extend over wells 408, 410 and 412 and row electrode 438 is disposed so as to extend over wells 214, 216 and 218.

Row electrodes 434, 436 and 438 may be any known electrically conductive material, non-limiting examples of which include metals, metal alloys, and semi-metals. Further, row electrodes may be disposed by any known manner.

Returning to FIG. 1, after the row electrodes are created (S114), connections are established (S116). For example, each column electrode 428, 430 and 432 and each row electrode 434, 436 and 438 may be provided with a respective electrode connection that is operable to receive a driving voltage.

In this manner, a positive/negative voltage applied between adjacent parallel electrodes will induce an electric field between such adjacent parallel electrodes. As will be described in greater detail below, this induced electric field will change any liquid metal that is exposed to the electric field from a first liquid metal state to a second liquid metal state.

In an example embodiment, described in more detail below with reference to FIGS. 7A-10C, the first liquid metal state is a first location and the second liquid metal state is a second location, wherein the induced electric field moves the liquid metal from the first location to the second location. However, in other embodiments, the first liquid metal state may be a first shape and the second liquid state may be a second shape, wherein the induced electric field changes the liquid metal from the first shape to the second shape.

Returning to FIG. 1, after connections are established (S116), method 100 stops (S118).

In the non-limiting example embodiment discussed above with reference to FIGS. 4A-4D, the electrodes are disposed above the wells to affect features of the liquid metal. However, in other embodiments, the electrodes may be differently disposed to affect the liquid metal. For example, in another non-limiting example embodiment, electrodes may be disposed at the bottom of the wells.

In another non-limiting example embodiment, a hydrophobic coating maybe disposed in the wells and channels of fluidic network layer 202. In this manner, the liquid metal may be affected by an electric field as induced by electrodes, without the need for an electrolyte.

Once a plasmonic transducer is fabricated, it may be used to detect different types of external stimuli. In a non-limiting example embodiment described with reference to FIGS. 5-11, the external stimulus is light.

Figure 5:
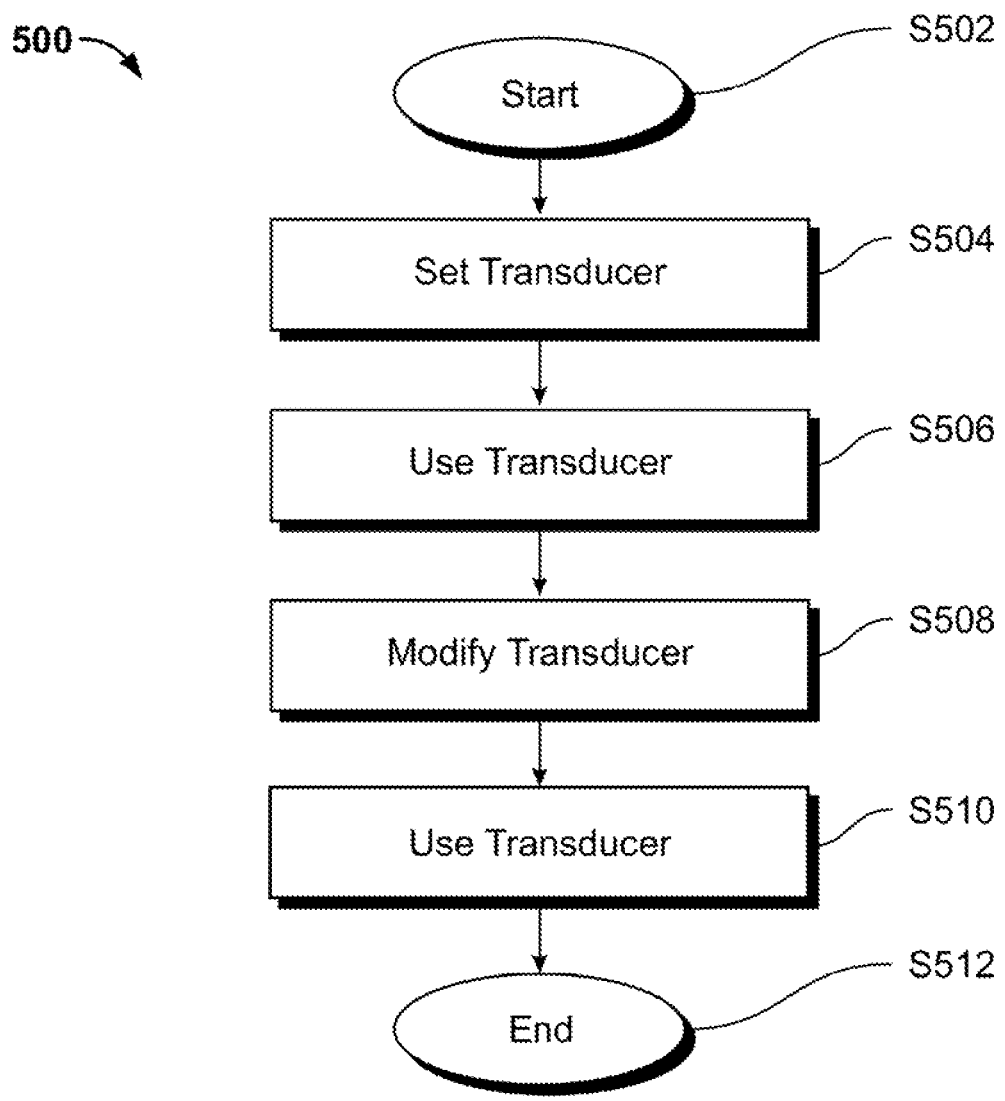
FIG. 5 illustrates an example method 500 of using an example plasmonic transducer in accordance with aspects of the present disclosure.

FIG. 5 illustrates an example method 500 of using an example plasmonic transducer in accordance with aspects of the present disclosure.

With method 500, an electromagnetic system is operable to change a state of liquid metal within a well of a plasmonic transducer from a first liquid metal state to a second liquid metal state. When in the first liquid metal state, the carbon-based substrate is operable to output a first output signal in response to transducing light of a first wavelength. When in the second liquid metal state, the carbon-based substrate is operable to output a second output signal in response to transducing light of a second wavelength. Further, an electromagnetic system is operable to induce a charge gradient in an electrolyte, so as to change the liquid metal from the first liquid metal state to the second liquid metal state.

In an example embodiment, the first liquid metal state is a first location of the liquid metal, whereas the second liquid metal state is a second location of the liquid metal. Further, in an example embodiment, an electromagnetic system is operable to induce a charge gradient in an electrolyte, such that the liquid metal is operable to move from one well, across a channel and into an adjacent well in the presence of the charge gradient in the electrolyte.

As shown in FIG. 5, method 500 starts (S502) and the sensor is set (S504). This will be described in greater detail with reference to FIG. 6.

Figure 6:
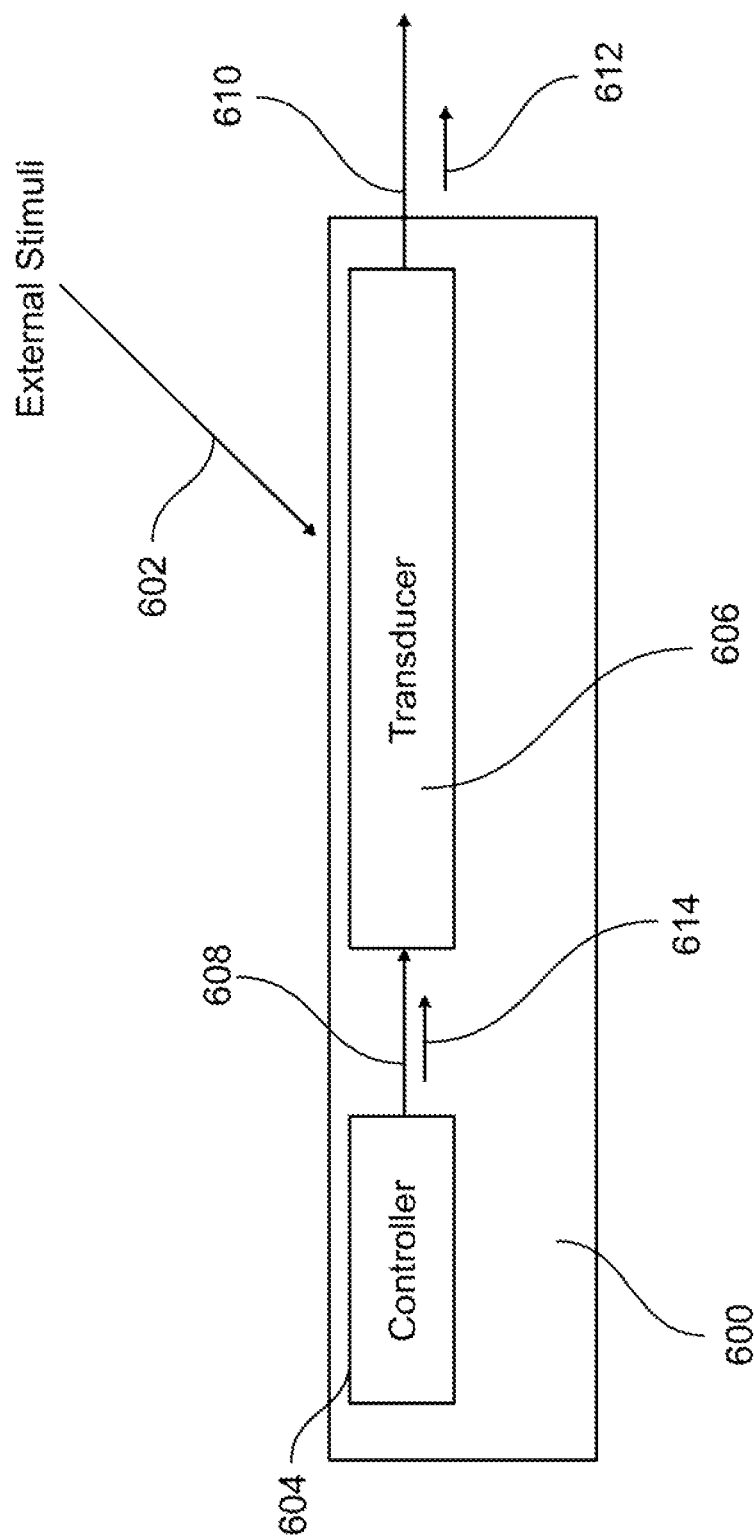
FIG. 6 illustrates an example transducing system that includes an example plasmonic transducer in accordance with aspects of the present disclosure.

FIG. 6 illustrates an example transducing system 600 that includes an example plasmonic plasmonic transducer in accordance with aspects of the present disclosure.

As shown in the figure, transducing system 600 includes a controller 604, a plasmonic transducer 606 and a control line 608. Controller 604 is arranged to communicate with plasmonic transducer 606 via control line 608. Plasmonic transducer 606 is arranged to detect light 602 and to output an output signal 612 on an output line 610 based on detected light 602.

Returning to FIG. 5, after the sensor is set (S504), the sensor is used (S506). For example, returning to FIG. 6, light 602 is detected by plasmonic transducer 606. In response, plasmonic transducer 606 outputs output signal 612.

In this example embodiment, plasmonic transducer 606 is the sensor discussed above with reference to FIG. 4D. Further, controller 604 is operable to provide a control signal via control line 608. In a non-limiting example embodiment, control line includes six distinct voltage lines operable to provide three distinct voltage signals 440, 442 and 444 to be applied to column electrodes 428, 430 and 432, respectively, and three distinct voltage signals 446, 448 and 450 to be applied to row electrodes 434, 436 and 438, respectively.

In this example of FIG. 6, presume for the sake of discussion, that plasmonic transducer 606 has an initial state corresponding to FIG. 4A, wherein liquid metal 414 is disposed in well 408, liquid metal 416 is disposed in well 410, liquid metal 418 is disposed in well 214 and liquid metal 420 is disposed in well 216.

It should be noted that many properties of plasmonic transducer 606 affect the relation between detected light and a resulting output signal. For example: the shape, size and distribution of wells; the shape, size and material of the liquid metal; and the distribution of the liquid metal may affect the relation between a detected light and a resulting output signal.

Presume for the sake of discussion, that plasmonic transducer 606 of FIG. 6 with the initial state corresponding to FIG. 4A is able to detect light 602 as an optical signal having a wavelength u and to generate a corresponding output signal 612. In particular, as shown in FIG. 4A, the location of the liquid metal affects the plasmon response of the plasmonic transducer.

With reference to FIG. 3, when light 602 is incident upon plasmonic transducer 606, light 602 passes through fluidic network layer 202 and interacts with the liquid metal. This interaction creates plasmons, which can then be converted into a corresponding electrical output signal by the carbon-based substrate 204.

In this manner, when the liquid metal is in the state shown in FIG. 4A, plasmonic transducer 606 is able to detect light 602.

In accordance with another aspect of the present disclosure, plasmonic transducer 606 is tunable, so as to controllably detect multiple different wavelengths of light.

Returning to FIG. 5, after the sensor is used (S506), the sensor is modified (S508). For example, consider the situation wherein after transducing light 602, plasmonic transducer 606 may be tuned to detect a different wavelength of light. This will be described with reference to FIGS. 7A-11.

Figure 7A:
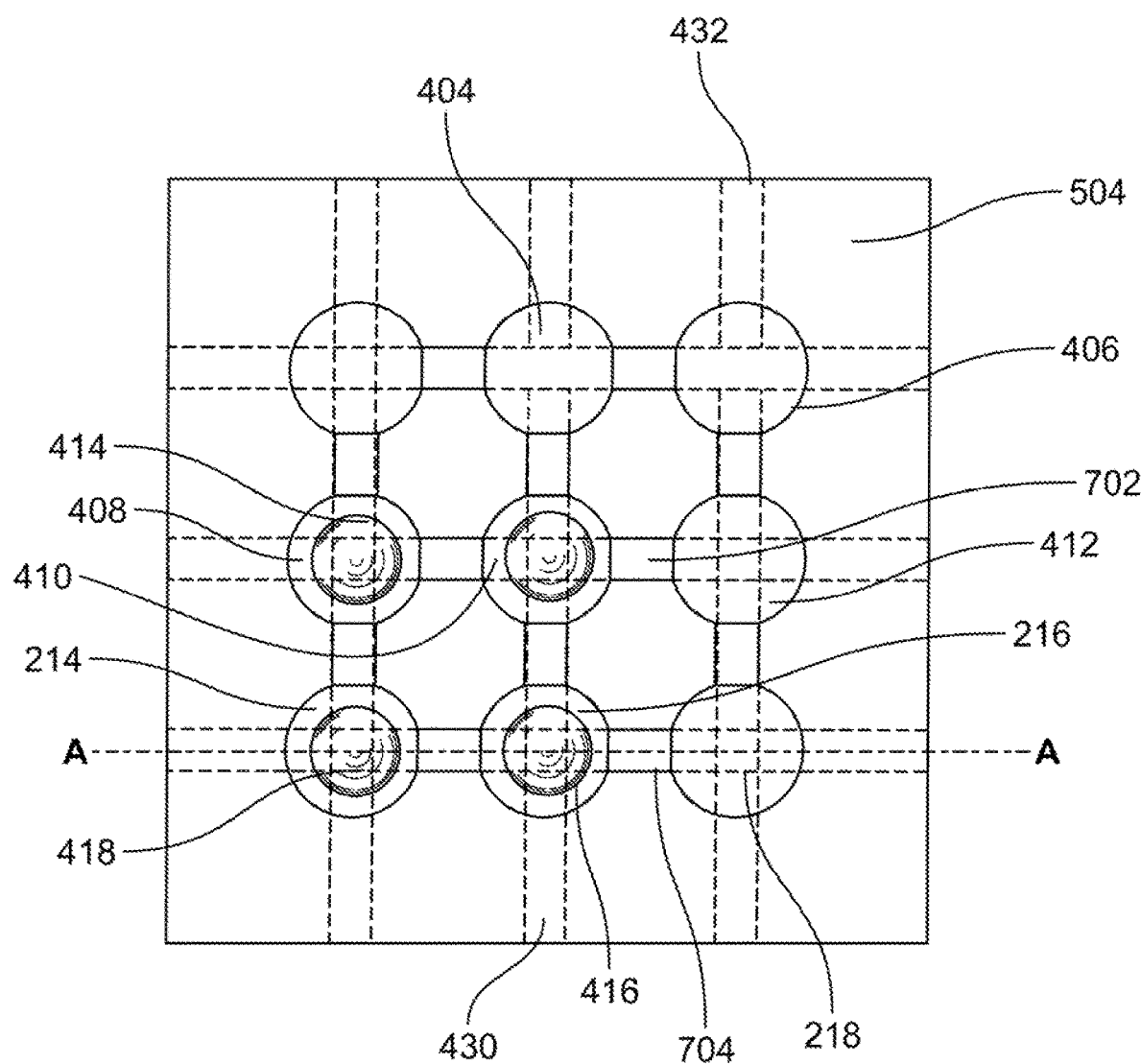
FIGS. 7A-C illustrate the plasmonic transducer of transducing system of FIG. 6 at a first time $t_1$, a second time $t_2$ and a third time $t_3$, respectively.
Figure 7B:
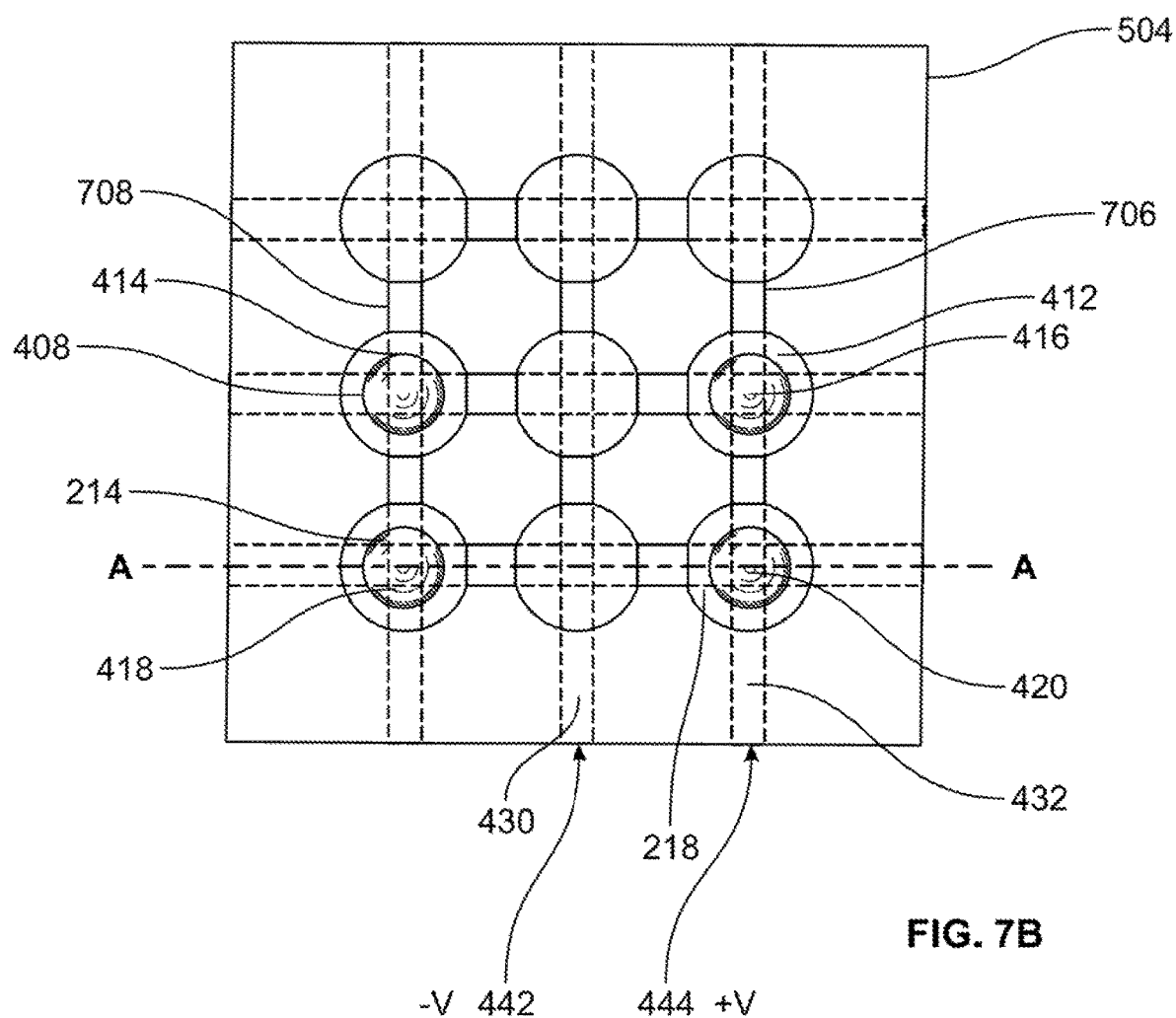
Figure 7C:
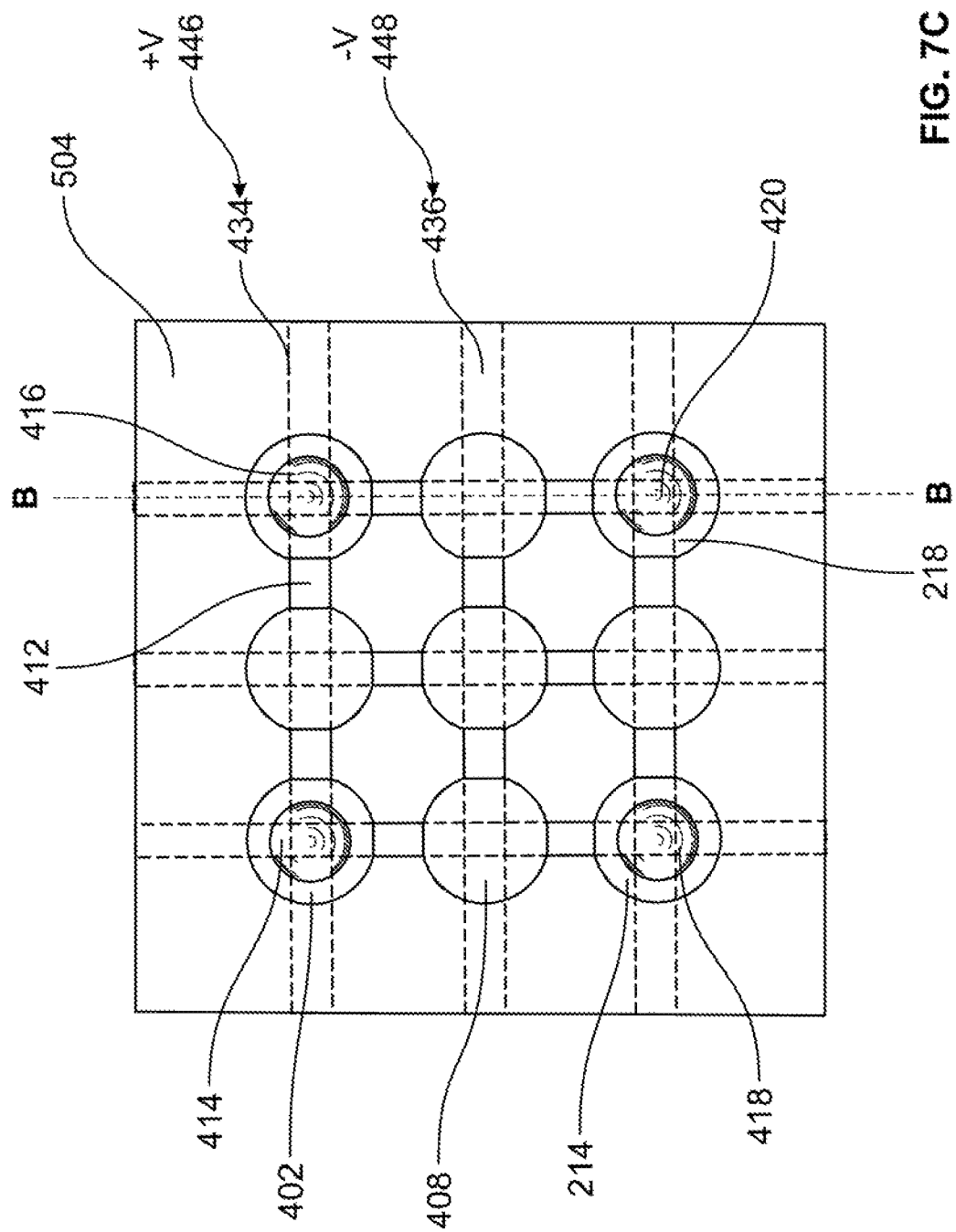

FIGS. 7A-C illustrate the plasmonic transducer of transducing system 600 at a first time $t_1$, a second time $t_2$ and a third time $t_3$, respectively.

As shown in FIG. 7A, at time $t_1$, plasmonic transducer 606 is in the state of as discussed above with reference to FIG. 4A and is able to detect light 602 as discussed above with reference to FIG. 6.

For purposes of discussion, let a user of transducing system 600 want to detect light having a wavelength $\lambda_3$. Further, for purposes of discussion, presume that plasmonic transducer 606 is able to detect light having a wavelength $\lambda_3$ when liquid metal is disposed in wells 402, 406, 214 and 218. In accordance with aspects of the present disclosure, the plasmonic transducer of transducing system 600 may be tuned to detect the desired wavelength $\lambda_3$. This will be further described with reference to FIGS. 7B-11.

Returning to FIG. 6, at time $t_2$, controller 604 provides a control signal 612 to plasmonic transducer 606 via control line 608. In this example embodiment, for the plasmonic transducer of transducing system 600 shown in FIG. 7B, control signal 612 takes for form of voltage signal 442 applied to column electrode 430 as a negative voltage −V and voltage signal 444 applied to column electrode 432 as a positive voltage +V. Negative voltage −V and positive voltage +V create a charge gradient in electrolyte 205 between wells 404, 410 and 216 under column electrode 430 and wells 406, 412 and 218 under column electrode 432.

Figure 8A:
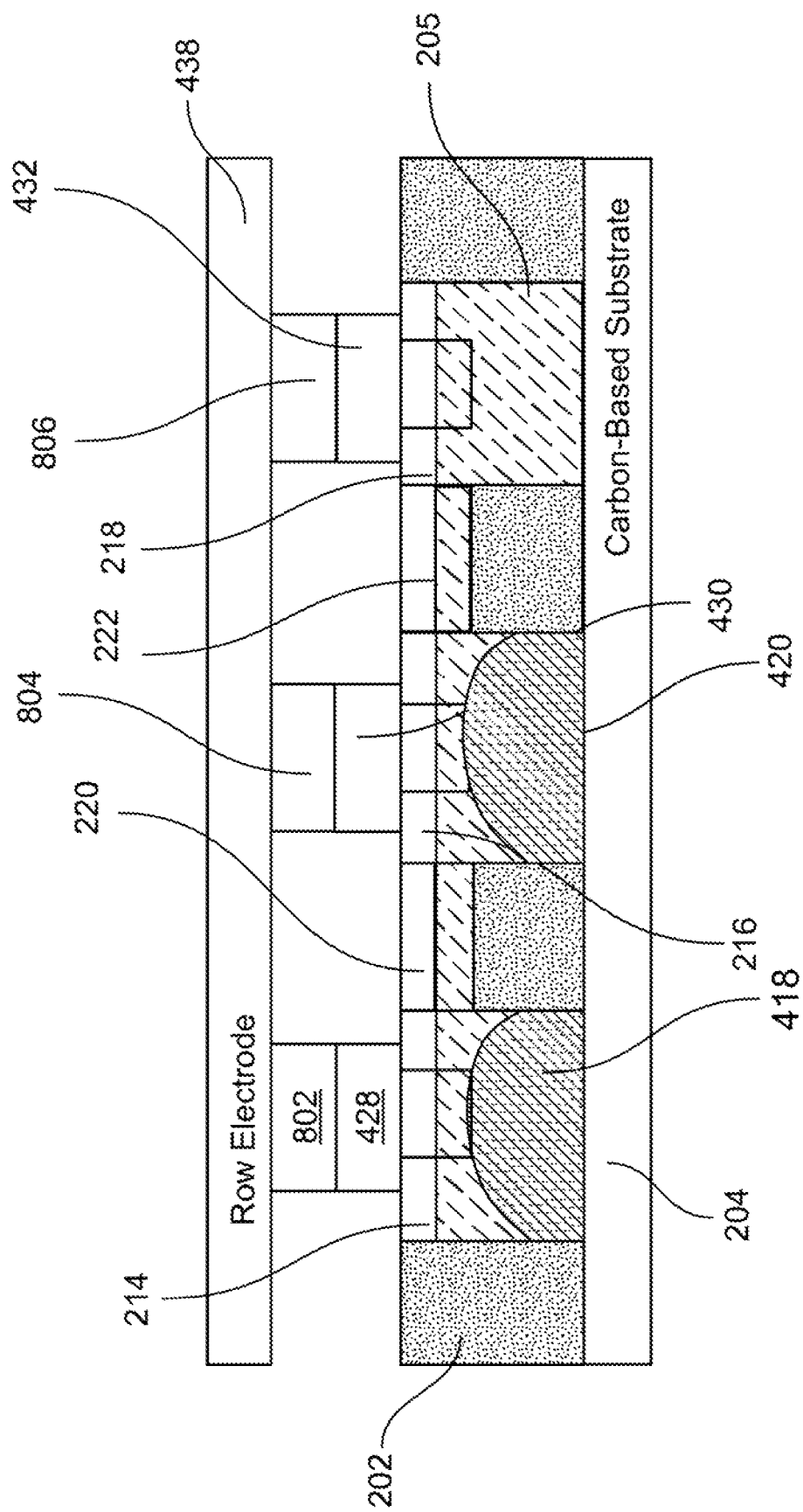
FIG. 8A illustrates a cross sectional view of the example device frame of FIG. 7A along dash-dotted line A-A, at time $t_1$.
Figure 8B:
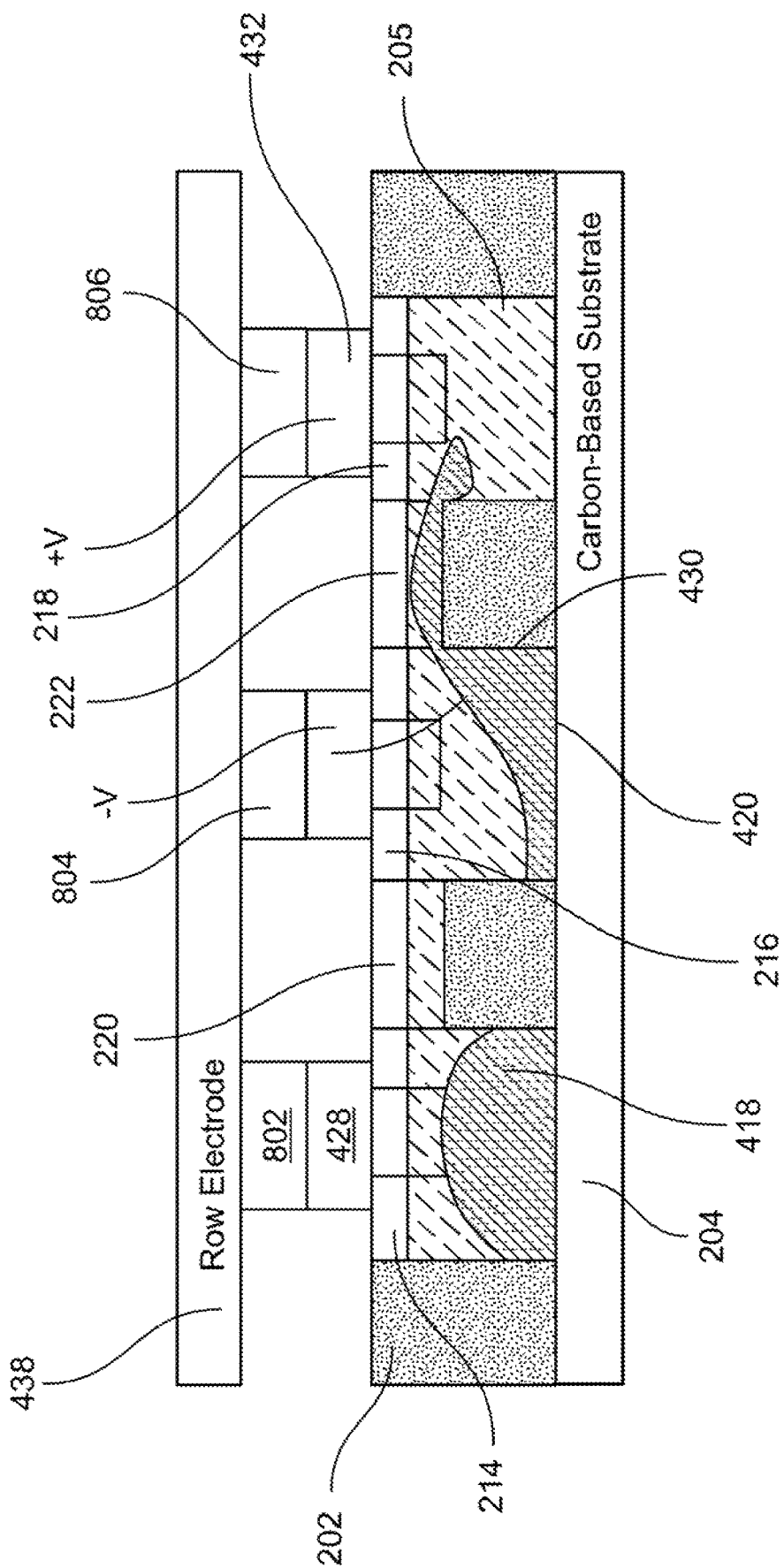
FIG. 8B illustrates a cross sectional view of the example device frame of FIG. 7A along dash-dotted line A-A, after time $t_1$.

Just prior to the application of voltages ±V, the liquid metal is disposed in fluidic network layer 202 as shown in FIG. 7A. FIG. 8A shows a cross-sectional view along dashed-dotted line A-A of FIG. 7B, just prior to the application of voltages ±V. FIG. 8B shows a cross-sectional view along dashed-dotted line A-A of FIG. 7B, just after the application of voltages ±V.

As shown in FIG. 8A, the row electrodes are electrically insulated from the column electrodes by way of separation with an insulating layer. In particular, an insulating layer 802 is disposed so as to cover column electrode 428, an insulating layer 804 is disposed so as to cover column electrode 430 and an insulating layer 806 is disposed so as to cover column electrode 432. Accordingly, insulating layer 802 electrically insulates row electrode 438 from column electrode 428, insulating layer 804 electrically insulates row electrode 438 from column electrode 430 and insulating layer 806 electrically insulates row electrode 438 from column electrode 432, It should be noted that insulating layer 802 is disposed along the entire length of column electrode 428, such that insulating layer 802 electrically insulates column electrode 428 additionally from row electrodes 436 (not shown) and 434 (not shown). Similarly, insulating layer 804 is disposed along the entire length of column electrode 430, such that insulating layer 804 electrically insulates column electrode 430 additionally from row electrodes 436 (not shown) and 434 (not shown). Further, insulating layer 806 is disposed along the entire length of column electrode 432, such that insulating layer 806 electrically insulates column electrode 432 additionally from row electrodes 436 (not shown) and 434 (not shown).

In other example embodiments, insulating layers may be disposed so as to run along the entire underside of row electrodes 434, 436 and 438. Still further, in some embodiments, an insulating layer may take the form of a single layer that covers the entirety of the area between the column electrodes and row electrodes.

Insulating layers 804, 806 and 808 maybe formed by any known method and may take the form of any known insulating material.

As shown in FIG. 8B, liquid metal 420 in well 216 moves through channel 222 and into well 218. This motion results from the charge gradient created in electrolyte 205 between positive voltage +V provided on column electrode 432 and negative voltage −V on column electrode 430. While voltages ±V maintains the charge gradient in electrolyte 205, liquid metal 420 continues to move from well 216 and into well 218, until liquid metal 420 is completely disposed in well 218. This is illustrated in FIG. 8C.

Figure 8C:
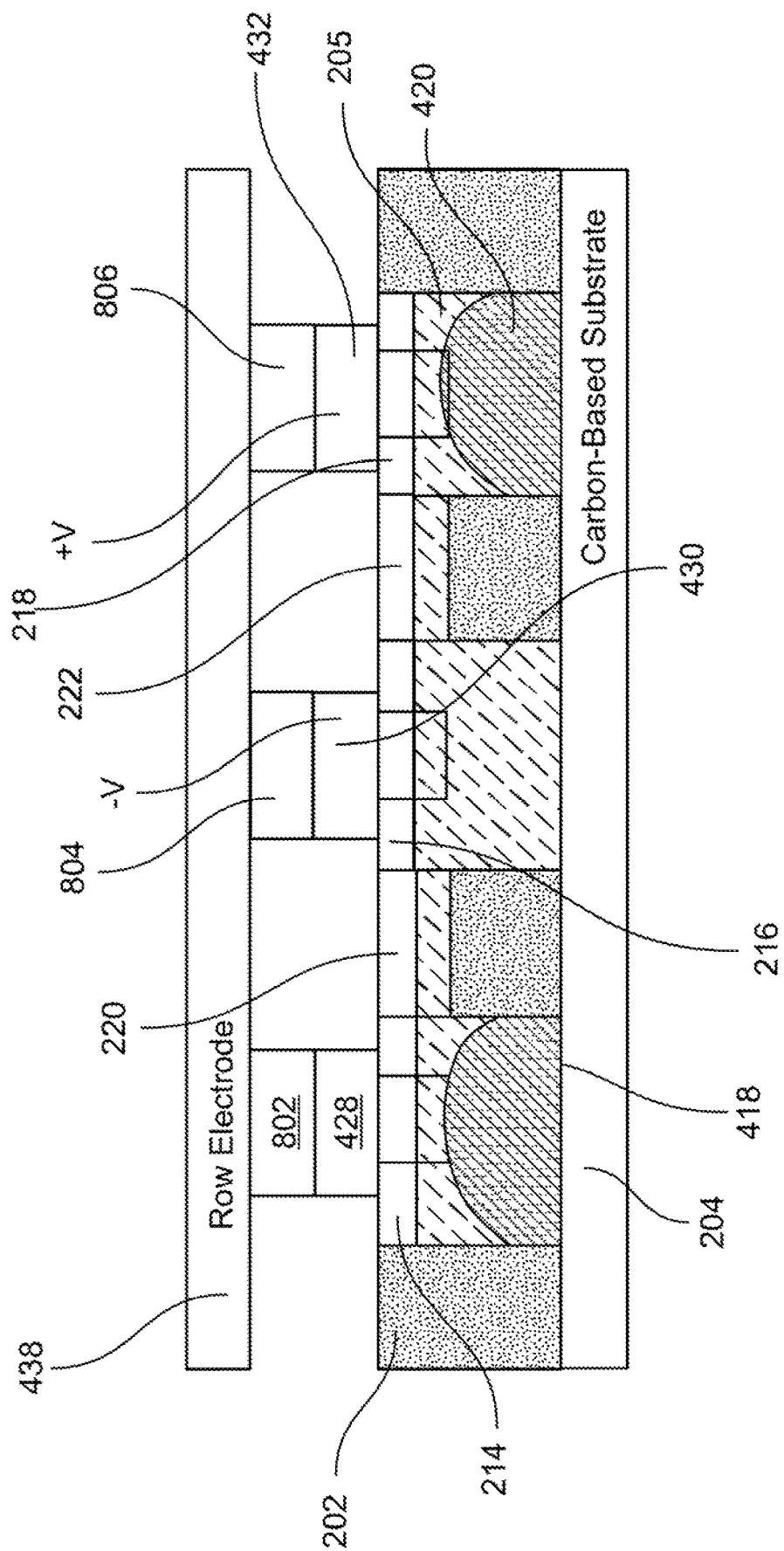
FIG. 8C illustrates a cross sectional view of the example device frame of FIG. 7B along dash-dotted line A-A, at time $t_2$.

FIG. 8C shows a cross-sectional view along dashed-dotted line A-A of FIG. 7B, at time $t_2$. As shown in the figure, liquid metal 420 has moved completely out of well 216 and is disposed in well 218. Similarly, as shown in FIG. 7B, because voltage +V is provided on column electrode 432, which also covers well 412, and negative voltage −V is provided on column electrode 430, which also covers well 410, liquid metal 416 has moved completely out of well 410 and into well 412.

In the state as shown in FIG. 7B, the distribution of liquid metal within the wells is different than the distribution of liquid metal within the wells as shown in FIG. 7A. As mentioned above, this different distribution of liquid metal will affect the transducer's plasmonic response in a manner that is different than that of the distribution of liquid metal as shown in FIG. 7A. If left in the state as shown in FIG. 7B, plasmonic transducer 606 would have a plasmonic response that is different than the plasmonic response of plasmonic transducer 606 in the state as shown in FIG. 7A. For purposes of discussion, consider that the plasmonic response of plasmonic transducer 606 in the state as shown in FIG. 7B is such that plasmonic transducer 606 is able to detect light of a wavelength $\lambda_2$. Again, for this example, the user of transducing system 600 would like to detect light of a wavelength $\lambda_3$. Accordingly, transducing system 600 must be further tuned.

The state of plasmonic transducer 606 may be further changed so as to have, yet another different plasmonic response by moving liquid metal 414 and liquid metal 416. This will be described in greater detail with reference to FIGS. 7C-11.

Controller 604 provides a new control signal to plasmonic transducer 606. This is shown in FIG. 9.

Figure 9:
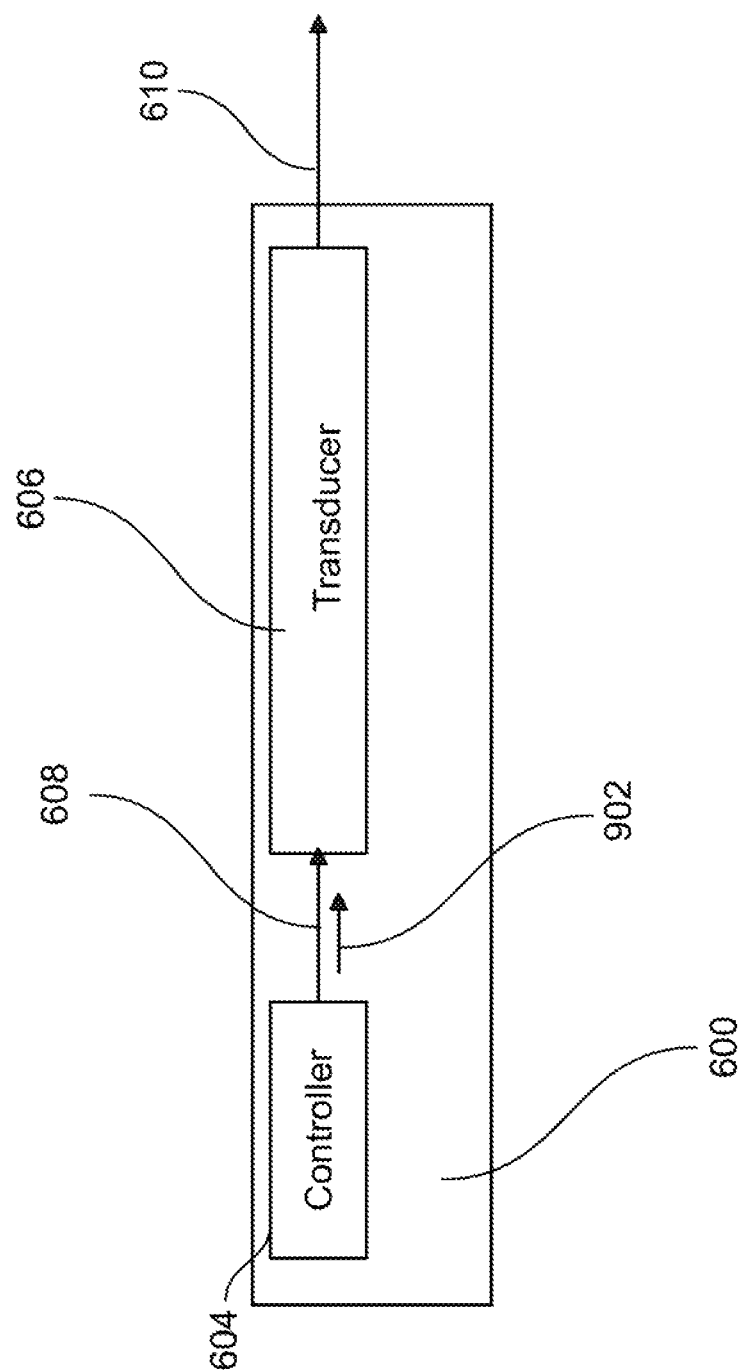
FIG. 9 illustrates the example transducing system of FIG. 6, wherein a new control signal is provided.

FIG. 9 illustrates the example transducing system of FIG. 6, wherein controller 604 provides a new control signal 902 to plasmonic transducer 606 by way of control line 608.

With new control signal 902, as shown in FIG. 7C, voltage signal 448 is applied to row electrode 436 as a negative voltage −V and voltage signal 446 is applied to row electrode 434 as a positive voltage +V. Negative voltage −V and positive voltage +V create a charge gradient in electrolyte 205 between wells 408, 410 and 412 under row electrode 436 and wells 402, 404 and 406 under row electrode 434.

Figure 10A:
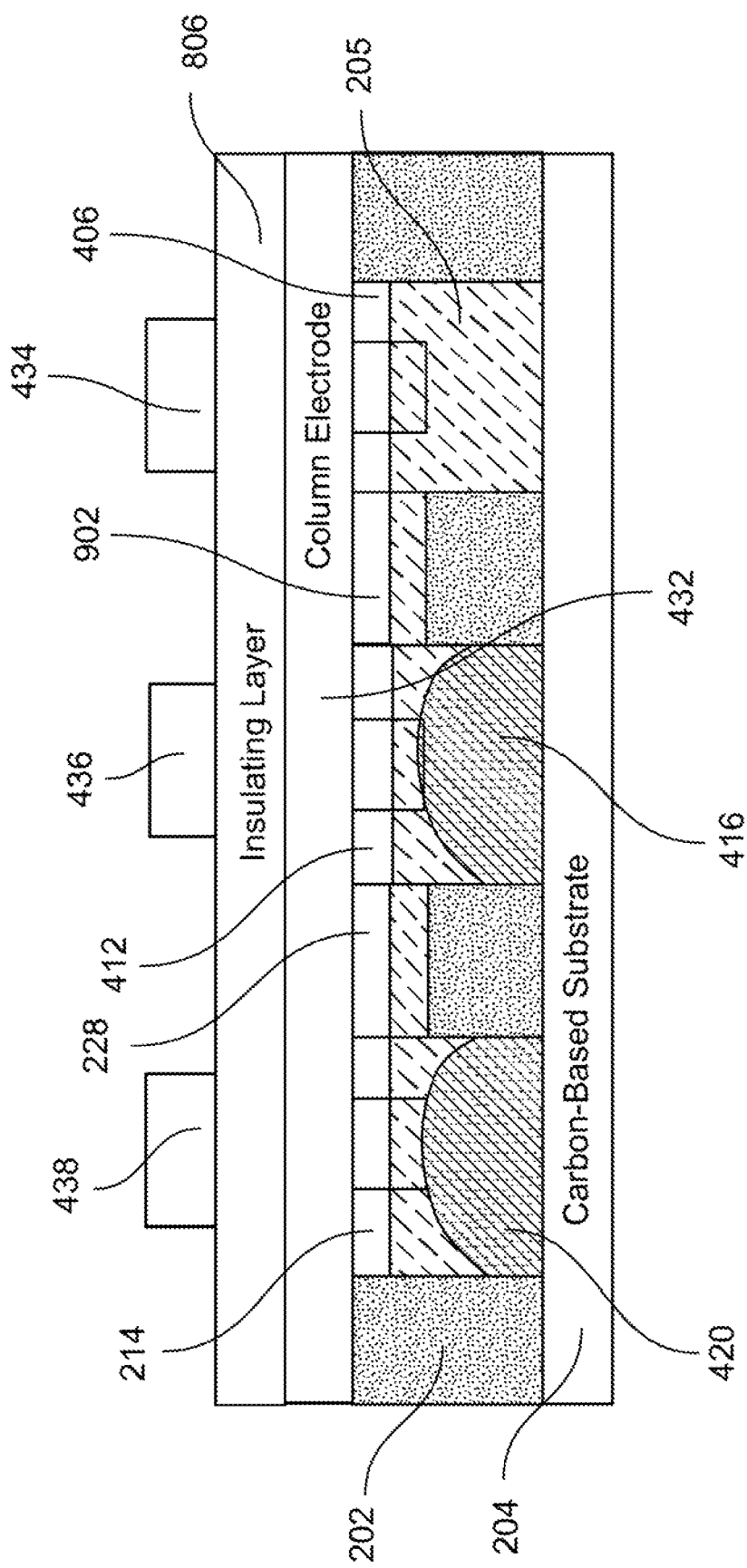
FIG. 10A illustrates a cross sectional view of the example device frame of FIG. 7A along dash-dotted line B-B, at time $t_2$.
Figure 10B:
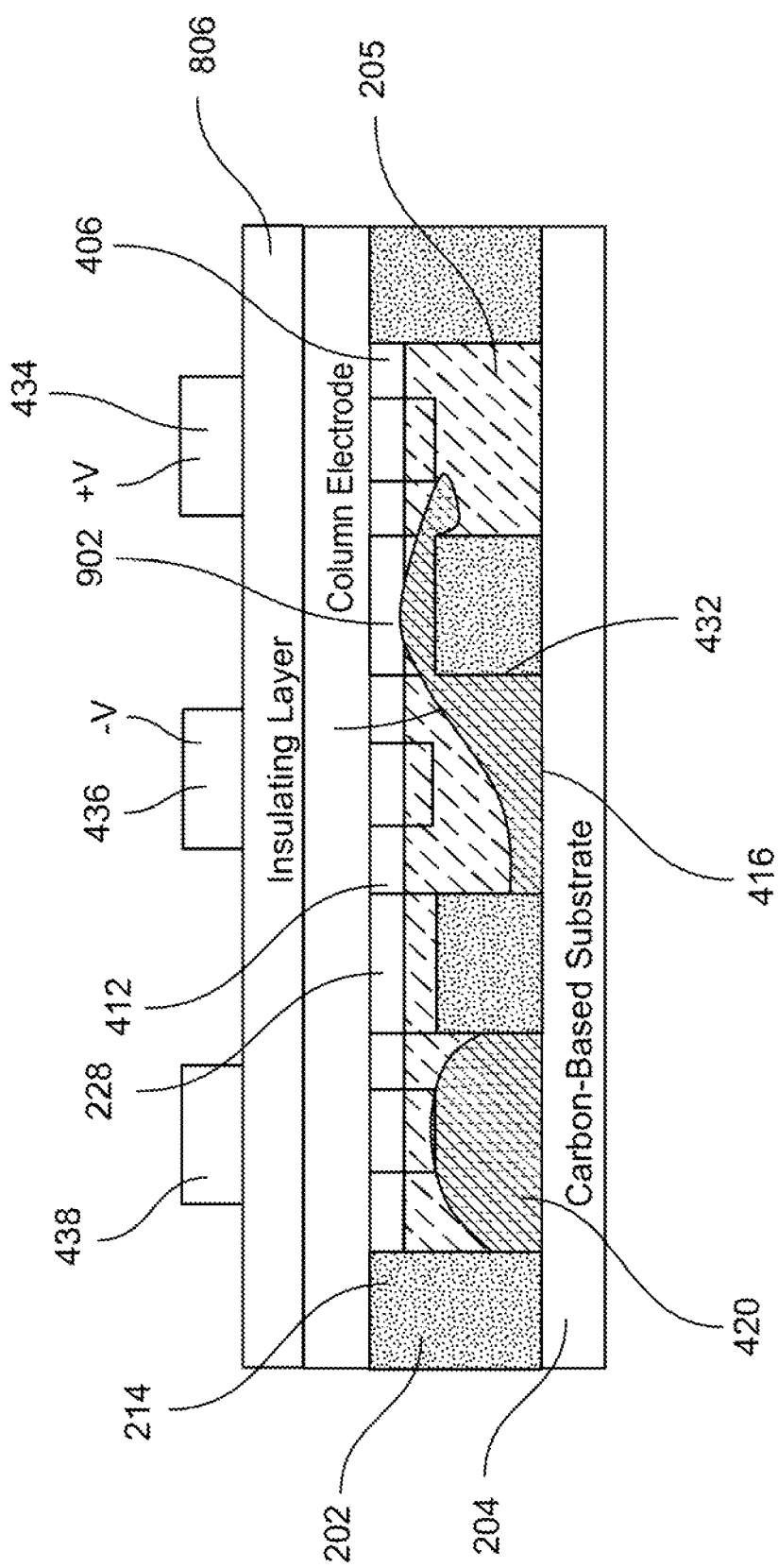
FIG. 10B illustrates a cross sectional view of the example device frame of FIG. 7A along dash-dotted line B-B, after time $t_2$.

Just prior to the application of voltages ±V, the liquid metal is disposed in fluidic network layer 202 as shown in FIG. 7B. FIG. 10A shows a cross-sectional view along dashed-dotted line B-B of FIG. 7B, just prior to the application of voltages ±V. FIG. 10B shows a cross-sectional view along dashed-dotted line B-B of FIG. 7B, just after the application of voltages ±V.

As shown in FIG. 10B, liquid metal 416 in well 412 moves through a channel 1002 and into well 406. This motion results from the charge gradient created in electrolyte 205 between positive voltage +V provided on row electrode 434 and negative voltage −V on row electrode 436. While voltages ±V maintains the charge gradient in electrolyte 205, liquid metal 416 continues to move from well 412 and into well 406, until liquid metal 416 is completely disposed in well 406. This is illustrated in FIG. 10C.

Figure 10C:
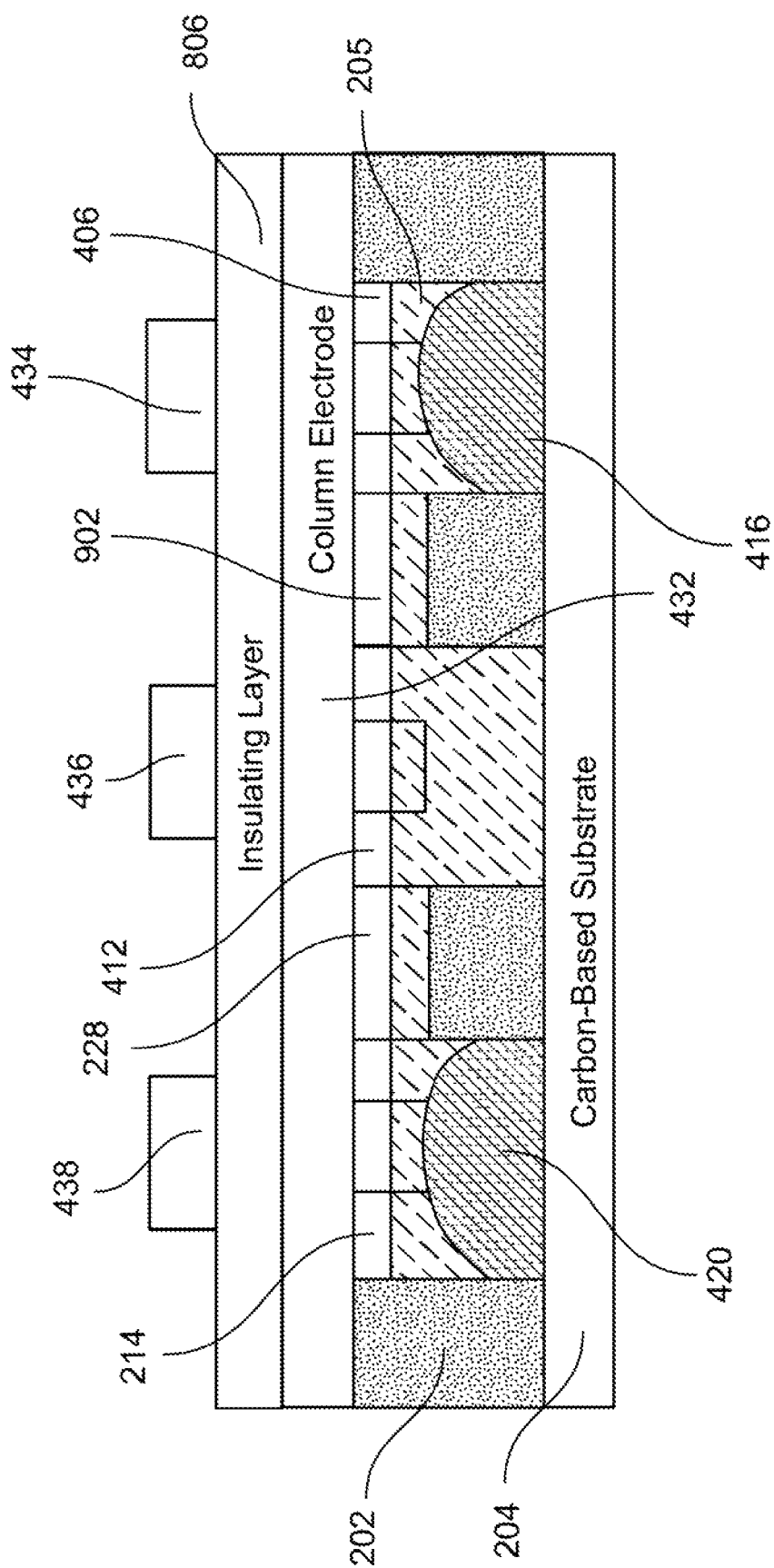
FIG. 10C illustrates a cross sectional view of the example device frame of FIG. 7B along dash-dotted line B-B, at time $t_3$.

FIG. 10C shows a cross-sectional view along dashed-dotted line B-B of FIG. 7C, at time $t_3$. As shown in the figure, liquid metal 416 has moved completely out of well 412 and is disposed in well 406. Similarly, as shown in FIG. 7C, because voltage +V is provided on row electrode 434, which also covers well 402, and negative voltage −V is provided on row electrode 436, which also covers well 408, liquid metal 414 has moved completely out of well 408 and into well 402.

In the state as shown in FIG. 7C, the distribution of liquid metal within the wells is different than the distribution of liquid metal within the wells as shown in FIG. 7B. As mentioned above, this different distribution of liquid metal will affect the transducer's plasmonic response in a manner that is different than that of the distribution of liquid metal as shown in FIG. 7B. If left in the state as shown in FIG. 7C, plasmonic transducer 606 would have a plasmonic response that is different than the plasmonic response of plasmonic transducer 606 in the state as shown in FIG. 7B. For purposes of discussion, consider that the plasmonic response of response of plasmonic transducer 606 in the state as shown in FIG. 7C is such that plasmonic transducer 606 is able to detect light of a wavelength $\lambda_3$.

Returning to FIG. 5, after the sensor is modified (S508), the sensor is again used (S510).

Figure 11:
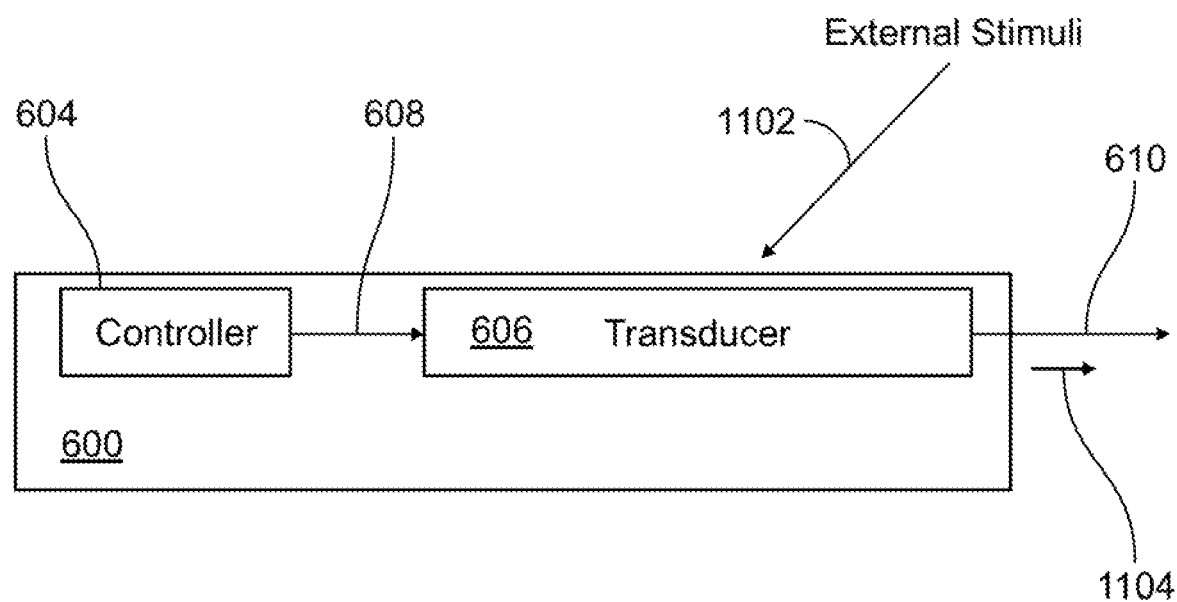
FIG. 11 illustrates the example transducing system of FIG. 6 at time $t_3$.

FIG. 11 illustrates the example transducing system 600 at time $t_3$.

As shown in the figure, a light 1102 is detected by plasmonic transducer 606. In response, plasmonic transducer 606 outputs output signal 1104.

In this example embodiment, plasmonic transducer 606 is the sensor discussed above with reference to FIG. 7C.

Presume for the sake of discussion, that plasmonic transducer 606 of FIG. 11 with a state corresponding to FIG. 7C is able to detect light 1102 as an optical signal having a wavelength $\lambda_3$ and to generate corresponding output signal 1104. In particular, as shown in FIG. 7C, the location and shapes the liquid metal affect the plasmon response of the plasmonic transducer.

Again, with reference to FIG. 3, when light 1102 is incident upon plasmonic transducer 606, light 1102 passes through fluidic network layer 202 and interacts with the liquid metal. This interaction creates plasmons, which can then be converted into a corresponding electrical output signal by carbon-based substrate 204.

In this manner, when the liquid metal is in the state shown in FIG. 7C, plasmonic transducer 606 is able to detect light 1102.

Returning to FIG. 5, after the sensor is again used (S510), method 500 stops (S512).

It should be noted that the example plasmonic transducer discussed above with reference to FIGS. 1-11, is a non-limiting example of the present disclosure.

Aspects of the present disclosure include using any type of liquid metal that exhibits electric actuation or electrowetting and correspondingly changes its periodicity, aperture diameter, and/or separation distance. For example, one could select mercury as the liquid metal. The carbon product can vary as well, including graphene, graphite, and carbon fullerenes. Electrode control voltage can be designed into the material, a printed circuit board, or equivalent.

The actuation can be performed in a variety of microfluidic structures not limited to that discussed above with reference to FIGS. 2A-4D, as long as it utilizes electric actuation and changes any of the three properties: periodicity, aperture diameter, and separation distance. For example, in another non-limiting example a high voltage may be applied across the liquid metal such that the liquid metal strongly wets to the carbon surface and the aperture diameter is increased. Periodicity can be envisioned through scaling up the proposed design in FIG. 4D, and applying the appropriate control voltages.

A plasmonic transducer in accordance with aspects of the present disclosure has three advantages over conventional plasmonic transducers.

With respect to a first advantage, as opposed to current THz sensors that are restricted to their designed frequency response, the proposed plasmonic transducer can be tuned instantaneously following deployment. Instead of implementing complex, power hungry mechanical actuation features after the sensor is deployed, the frequency response can be tuned with a low power DC or square-wave voltage source that can be added to the sensor's control unit.

With respect to a second advantage, liquid metal and/or gallium alloys pose problems in that alloys tend to oxidize/amalgamate with standard metals such as gold, silver, and copper. The inertness of carbon provides an additional benefit in that liquid metal and or gallium alloys do not amalgamate with carbon allotropes.

With respect to a third advantage, this sensor utilizes the great optical-sensing potential that the carbon product, graphene, has shown to exhibit when coupled in hybrid electronics.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A plasmonic transducer comprising:
    a fluidic network layer having a fluidic network layer front, a fluidic network layer back, a first through-hole passing from said fluidic network layer front to said fluidic network layer back;
    a carbon-based substrate disposed on said fluidic network layer back;
    a liquid metal disposed in said first through-hole;
    an electromagnetic system operable to change the liquid metal from a first liquid metal state to a second liquid metal state;
    wherein said transducer is operable to provide a first output signal when said liquid metal is in the first liquid metal state,
    wherein said transducer is operable to provide a second output signal when said liquid metal is in the second liquid metal state.

2. The plasmonic transducer of claim 1, wherein said liquid metal comprises a eutectic alloy that comprises at least two of metals selected from a group of metals including gallium, indium and tin.

3. The plasmonic transducer of claim 1, wherein said carbon-based substrate comprises at least one layer having a composition of carbon.

4. The plasmonic transducer of claim 1, further comprising:
    an electrolyte,
    wherein said fluidic network layer further has a second through-hole passing from said fluidic network layer front to said fluidic network layer back and a channel in said fluidic network layer front connecting said first through-hole to said second through-hole,
    wherein said electrolyte is disposed in said first through-hole, said second through-hole and said channel,
    wherein said electromagnetic system is operable to induce in said electrolyte a charge gradient, and
    wherein said liquid metal is operable to move from the first through-hole, across said channel and into said second through-hole in a presence of the charge gradient in said electrolyte.

5. The plasmonic transducer of claim 4, wherein said electrolyte comprises sodium hydroxide.

6. The plasmonic transducer of claim 1, further comprising:
    a hydrophobic coating,
    wherein said fluidic network layer further has a second through-hole passing from said fluidic network layer front to said fluidic network layer back and a channel in said fluidic network layer front connecting said first through-hole to said second through-hole,
    wherein said hydrophobic coating is disposed so as to coat said first through-hole, said second through-hole and said channel, and
    wherein electromagnetic system operable to change the liquid metal from the first liquid metal state as being in the first through-hole to the second liquid metal state as being in the second through-hole moving the liquid metal across the channel.

7. The plasmonic transducer of claim 1,
    wherein said an electromagnetic system comprises a first electrode and a second electrode,
    wherein said first electrode is operable to receive a first voltage,
    wherein said second electrode is operable to receive a second voltage, and
    wherein said first electrode and said second electrode are arranged to induce an electric field so as to change the liquid metal from a first liquid metal state to a second liquid metal state when said first electrode receives the first voltage and when said second electrode receives the second voltage.

8. A transducing system operable to detect a first external stimulus and a second external stimulus, and to produce a first output signal and a second output signal, said transducing system comprising:
    a plasmonic transducer comprising:
        a fluidic network layer having a fluidic network layer front, a fluidic network layer back, a first through-hole passing from said fluidic network layer front to said fluidic network layer back;
        a carbon-based substrate disposed on said fluidic network layer back;
        a liquid metal disposed in said first through-hole;
        an electromagnetic system operable to change the liquid metal from a first liquid metal state to a second liquid metal state in response to receipt of a control signal; and
    a controller operable to generate the control signal,
    wherein said transducer is operable to provide the first output signal, including photoelectric and/or photoluminescence response, based on the first external stimulus when said liquid metal is in the first liquid metal state, and
    wherein said transducer is operable to provide the second output signal, including photoelectric and/or photoluminescence response, based on the second external stimulus when said liquid metal is in the second liquid metal state.

9. The transducing system of claim 8, wherein said liquid metal comprises a eutectic alloy that comprises at least two of metals selected from a group of metals including gallium, indium and tin.

10. The transducing system of claim 8, wherein said carbon-based substrate comprises at least one layer having a composition of carbon.

11. The transducing system of claim 8, wherein said plasmonic transducer further comprises:
an electrolyte,
wherein said fluidic network layer further has a second through-hole passing from said fluidic network layer front to said fluidic network layer back and a channel in said fluidic network layer front connecting said first through-hole to said second through-hole,
wherein said electrolyte is disposed in said first through-hole, said second through-hole and said channel,
wherein said electromagnetic system is operable to induce in said electrolyte a charge gradient, and
wherein said liquid metal is operable to move from the first through-hole, across said channel and into said second through-hole in a presence of the charge gradient in said electrolyte.

12. The transducing system of claim 11, wherein said electrolyte comprises sodium hydroxide.

13. The transducing system of claim 8, wherein said plasmonic transducer further comprises:
a hydrophobic coating,
wherein said fluidic network layer further has a second through-hole passing from said fluidic network layer front to said fluidic network layer back and a channel in said fluidic network layer front connecting said first through-hole to said second through-hole,
wherein said hydrophobic coating is disposed so as to coat said first through-hole, said second through-hole and said channel, and
wherein electromagnetic system operable to change the liquid metal from the first liquid metal state as being in the first through-hole to the second liquid metal state as being in the second through-hole moving the liquid metal across the channel.

14. The transducing system of claim 8,
wherein said an electromagnetic system comprises a first electrode and a second electrode,
wherein said first electrode is operable to receive a first voltage,
wherein said second electrode is operable to receive a second voltage, and
wherein said first electrode and said second electrode are arranged to induce an electric field so as to change the liquid metal from a first liquid metal state to a second liquid metal state when said first electrode receives the first voltage and when said second electrode receives the second voltage.

15. A method of transducing a first external stimulus and a second external stimulus, said method comprising:
receiving the first external stimulus via a plasmonic transducer comprising a fluidic network layer, a carbon-based substrate, a liquid metal, and an electromagnetic system;
providing, via the carbon-based substrate, a first output signal based on the first external stimulus;
generating, via a controller, a control signal;
modifying the plasmonic transducer via the control signal;
providing, via the modified plasmonic transducer, a second output signal based on the second external stimulus,
wherein said receiving the first external stimulus via a plasmonic transducer comprises receiving the first external stimulus via the plasmonic transducer comprising:
the fluidic network layer having a fluidic network layer front, a fluidic network layer back and a first through-hole passing from the fluidic network layer front to the fluidic network layer back;
the carbon-based substrate disposed on the fluidic network layer back;
the liquid metal disposed in the first through-hole;
the electromagnetic system operable to change the liquid metal from a first liquid metal state to a second liquid metal state in response to receipt of the control signal; and
the controller operable to generate the control signal,
wherein the transducer is operable to provide the first output signal based on the first external stimulus when the liquid metal is in the first liquid metal state, and
wherein the transducer is operable to provide a second output signal based on the second external stimulus when the liquid metal is in the second liquid metal state.

16. The method of claim 15, wherein said receiving the first external stimulus via a plasmonic transducer comprises receiving the first external stimulus via the plasmonic transducer further comprising:
an electrolyte,
wherein the fluidic network layer further has a second through-hole passing from the fluidic network layer front to the fluidic network layer back and a channel in the fluidic network layer front connecting the first through-hole to the second through-hole,
wherein the electrolyte is disposed in the first through-hole, the second through-hole and the channel,
wherein the electromagnetic system is operable to induce in the electrolyte a charge gradient, and
wherein the liquid metal is operable to move from the first through-hole, across the channel and into the second through-hole in a presence of the charge gradient in the electrolyte.

17. The method of claim 15, wherein said receiving the first external stimulus via a plasmonic transducer comprises receiving the first external stimulus via the plasmonic transducer further comprising:
a hydrophobic coating,
wherein said fluidic network layer further has a second through-hole passing from said fluidic network layer front to said fluidic network layer back and a channel in said fluidic network layer front connecting said first through-hole to said second through-hole,
wherein said hydrophobic coating is disposed so as to coat said first through-hole, said second through-hole and said channel, and
wherein electromagnetic system operable to change the liquid metal from the first liquid metal state as being in the first through-hole to the second liquid metal state as being in the second through-hole moving the liquid metal across the channel.

18. The method of claim 15, wherein the liquid metal comprises a eutectic alloy that comprises at least two of metals selected from a group of metals including gallium, indium and tin.

19. The method of claim 15, wherein the carbon-based substrate comprises at least one layer having a composition of carbon.

* * * * *